United States Patent [19]

Weedling et al.

[11] Patent Number: 5,067,189

[45] Date of Patent: Nov. 26, 1991

[54] AIR CHAMBER TYPE PATIENT MOVER AIR PALLET WITH MULTIPLE CONTROL FEATURES

[76] Inventors: Robert E. Weedling; William R. Swallen, both of c/o LCI Medical, Inc., P.O. Box 100, Rte. 191 at Rte. 33 Interchange, Stockertown, Pa. 18083; Raynor Johnson, 100 Dayett Mills Rd., Newark, Del. 19702; Jack Wegener, Rte. 2, Box 195, Preston, Md. 21655; David T. Davis, R.D. 1, Box 356A, Easton, Pa. 18042

[21] Appl. No.: 507,534
[22] Filed: Apr. 11, 1990
[51] Int. Cl.⁵ .......................... B65G 7/06; A61G 7/14
[52] U.S. Cl. ........................................ 5/81 R; 5/453; 5/455; 180/125; 414/676
[58] Field of Search ............... 5/81 R, 81 B, 453, 469, 5/423, 455; 180/125, 124, 116; 414/676

[56] References Cited

U.S. PATENT DOCUMENTS

| | | | |
|---|---|---|---|
| 2,683,636 | 7/1954 | Wilcox | 308/9 |
| 2,848,820 | 8/1958 | Wallin et al. | 34/23 |
| 2,938,590 | 5/1960 | Barnett | 180/1 |
| 3,169,807 | 2/1965 | Abel et al. | 308/9 |
| 3,245,487 | 4/1966 | Mackie | 180/7 |
| 3,253,667 | 5/1966 | Mackie | 180/7 |
| 3,268,023 | 8/1966 | Di Napoli, Jr. | 180/7 |
| 3,291,237 | 12/1966 | Hopkins et al. | 180/7 |
| 3,376,083 | 4/1968 | Muijderman | 308/9 |
| 3,385,390 | 5/1968 | Guienne | 180/116 |
| 3,400,780 | 9/1968 | Kesling | 180/124 |
| 3,414,076 | 12/1968 | Bertin et al. | 180/124 |
| 3,439,581 | 4/1969 | Wilkins | 91/55 |
| 3,513,934 | 5/1970 | Crowley | 180/124 |
| 3,513,936 | 5/1970 | Crowley et al. | 180/124 |
| 3,610,364 | 10/1971 | Snoeyenbos | 180/124 |
| 3,618,694 | 11/1971 | Crowley | 180/124 |
| 3,667,073 | 6/1972 | Renfroe | 5/60 |
| 3,724,588 | 4/1973 | Bertin et al. | 180/118 |
| 3,756,343 | 9/1973 | Joyce, Jr. | 180/124 |
| 3,757,699 | 9/1973 | Wirth | 104/134 |
| 3,760,899 | 9/1973 | Crossman et al. | 180/125 |
| 3,948,344 | 4/1976 | Johnson et al. | 180/124 |
| 4,272,856 | 6/1981 | Wegener et al. | 5/81 R |
| 4,417,639 | 4/1983 | Wegener | 180/125 |
| 4,517,690 | 5/1985 | Wegener | 5/81 R |
| 4,528,704 | 7/1985 | Wegener et al. | 5/81 R |
| 4,686,719 | 8/1987 | Johnson et al. | 5/81 R |
| 4,789,039 | 12/1988 | Bjork | 180/124 |

FOREIGN PATENT DOCUMENTS

177370 3/1922 United Kingdom.
1096120 12/1967 United Kingdom.

Primary Examiner—Alexander Grosz
Attorney, Agent, or Firm—Sughrue, Mion, Zinn, Macpeak & Seas

[57] ABSTRACT

Air chamber-type air pallets incorporate side-to-side linked air pressurized tubes or chambers in two integrated rows, having common members for adjacent chambers under air pressurization rendered rigid over a certain extent to rigidify the air chambers thereof which form load backing chambers in place of rigid backing members conventionally employed in air pallets maintaining the load footprint borne by the air pressurized backing chambers matched by that of the developed air bearing or air film by passage of compressed air through the pattern of perforations. Preferably, linked tubes of one row are laterally offset but integrated physically to those of a second row to both limit lateral shrinkage of linked tubes extending completely across the pin hole perforations within the thin, flexible bottom sheet partially forming such air pallets. The use of upper and lower rows of tubes subject to air pressurization provides adequate separation between the load and the fixed support surface to prevent contact of the load and the fixed support surface irrespective of loss of pressurization of a given one of the tubes of either row. The air pallets are formed totally of thin, flexible sheet material, permitting deflation and transfer from one locale to another. The air pallets function as stable supports for the patient during transport over the developed air film between the patient mover and an underlying fixed support surface. A single row of linked tubes formed of two thin, flexible sheets, acting as plenum chambers and having perforations within the thin, flexible bottom sheet functions adequately to support the patient directly on the top thin, flexible sheet with the bottom tangential surfaces of the individual tubes flattening. Preferably the area of perforations for each tube is limited transversely to the flattened portions of those tubes facing the underlying fixed support surface, with the developed air film having a surface area matching that of the patient.

26 Claims, 8 Drawing Sheets

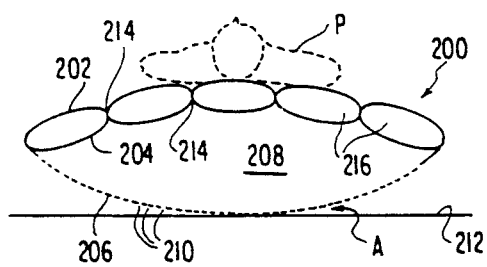
FIG.1 PRIOR ART
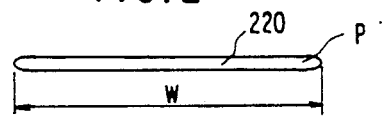
FIG.2
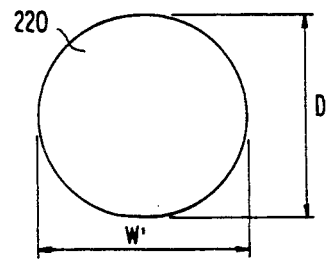
FIG.3
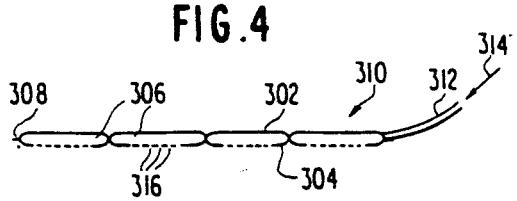
FIG.4
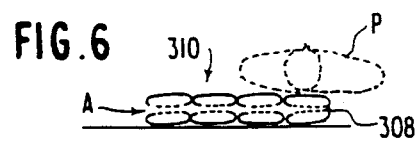
FIG.6
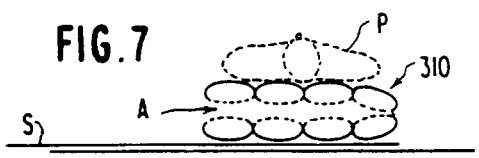
FIG.5
FIG.7
FIG.8
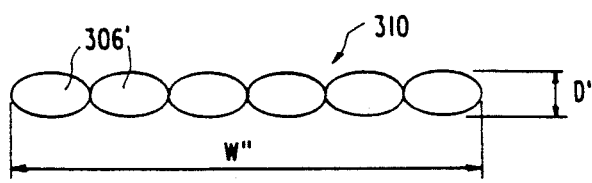
FIG.9

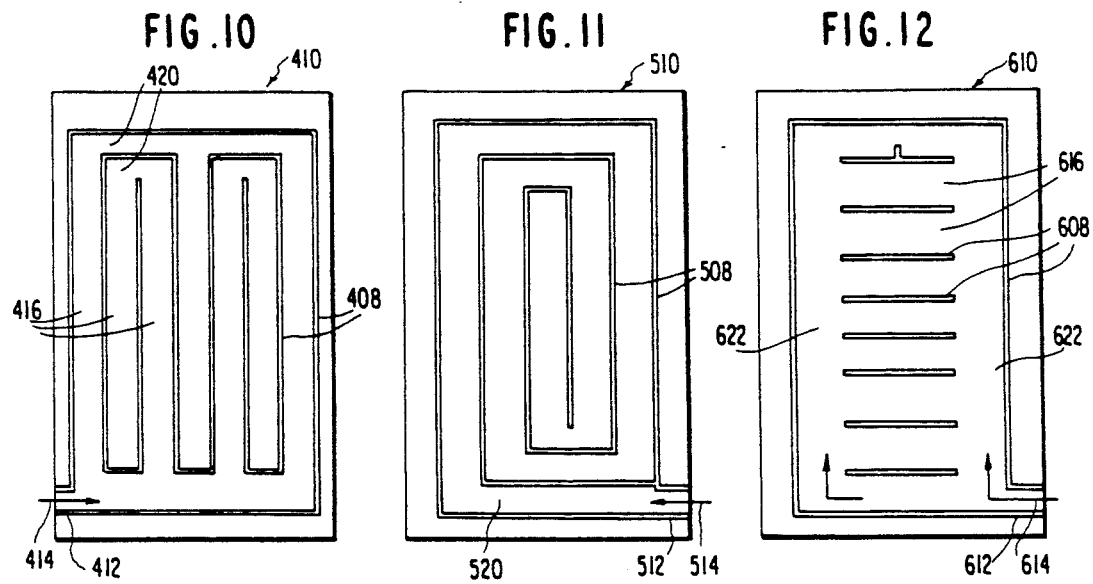
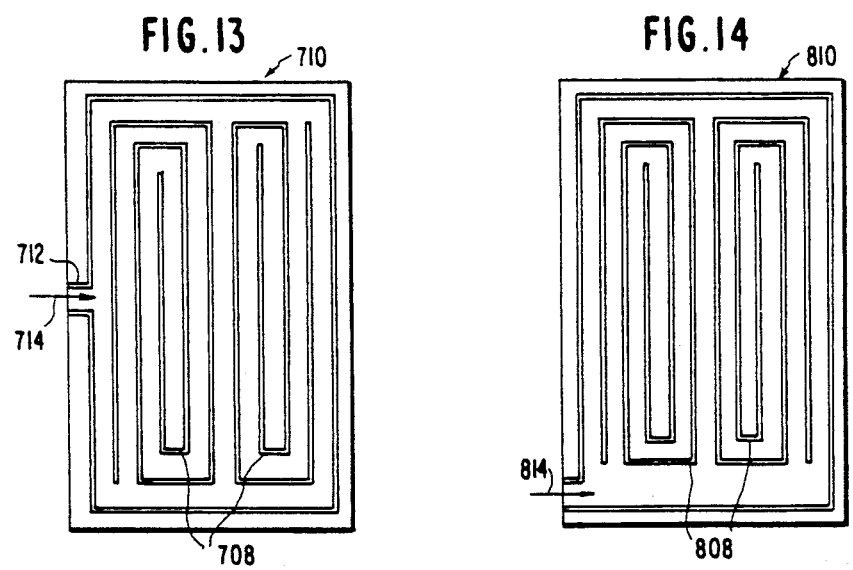
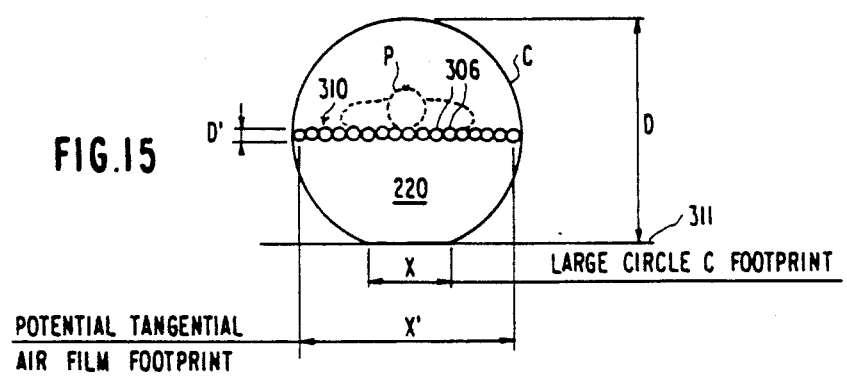

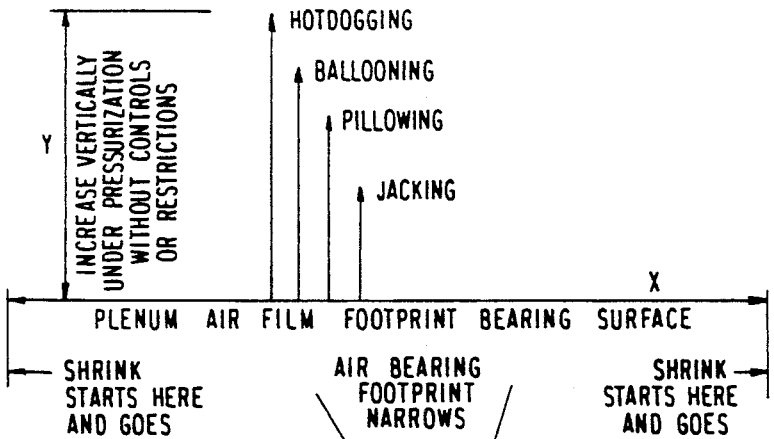
FIG.16
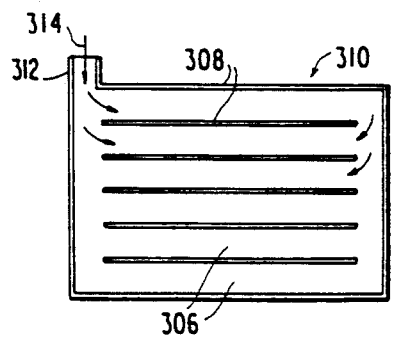
FIG.17
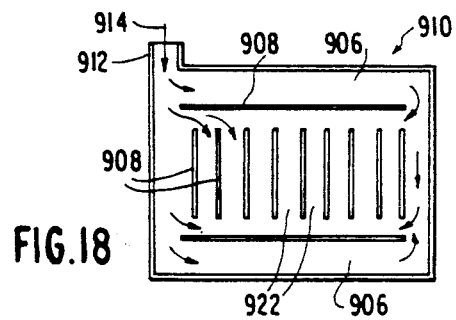
FIG.18
FIG.19
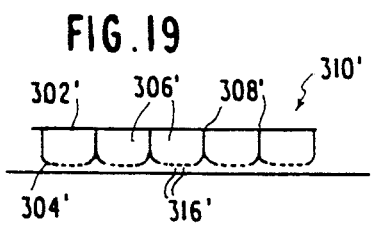
FIG.20
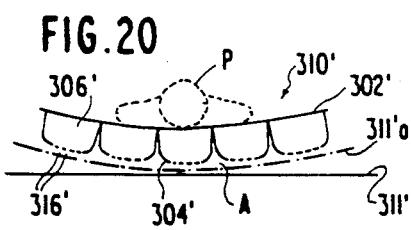
FIG.21
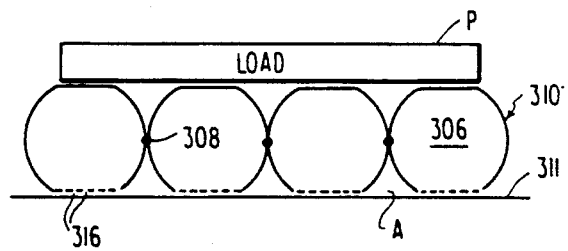
FIG.22
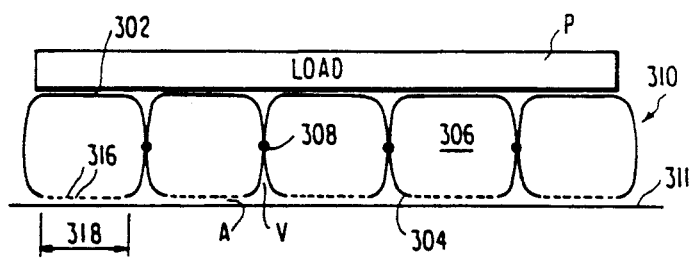

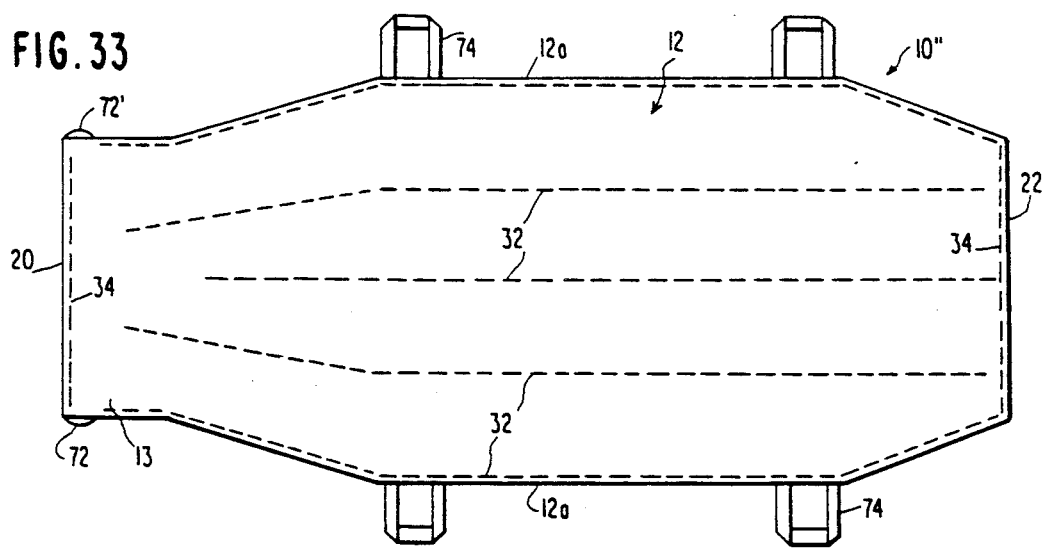
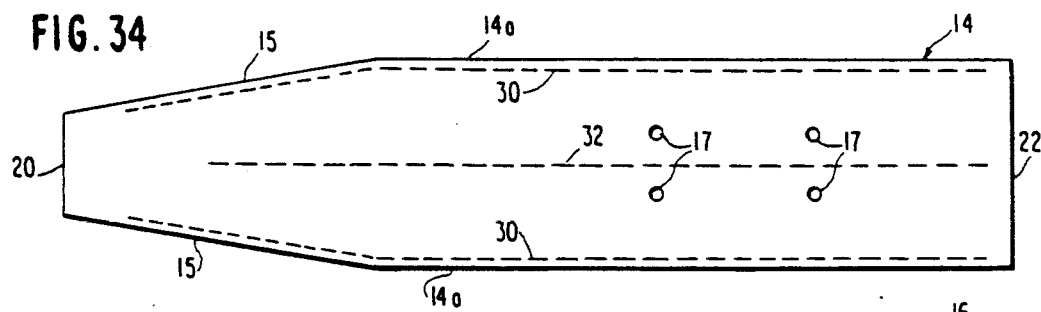
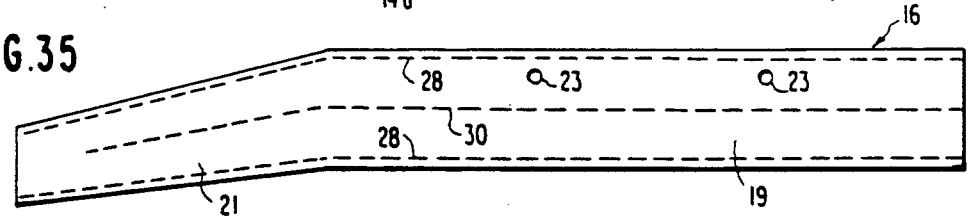
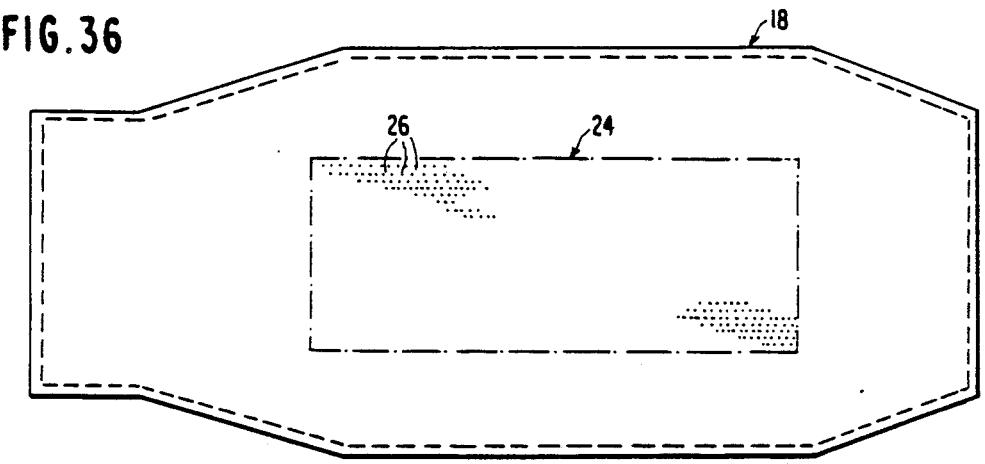

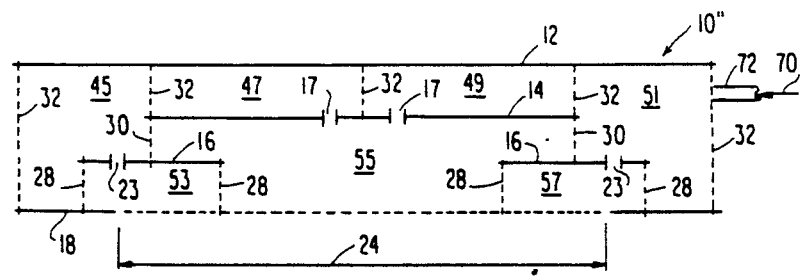
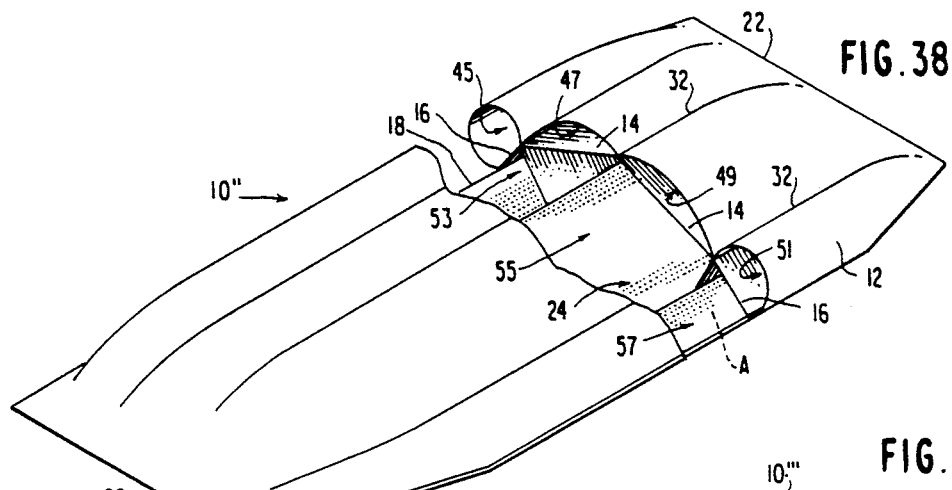
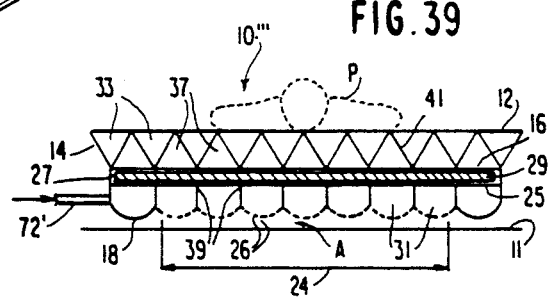
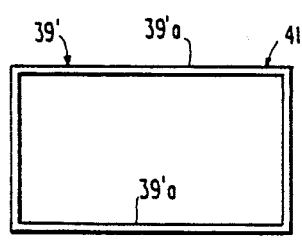
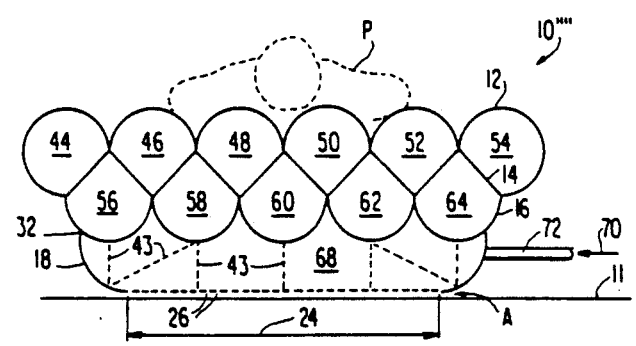

AIR CHAMBER TYPE PATIENT MOVER AIR PALLET WITH MULTIPLE CONTROL FEATURES

FIELD OF THE INVENTION

This invention relates to air pallets, and more particularly to air pallet-type patient movers for facilitating comfortable support of and transfer of patients and more particularly to a semi-rigid air pallet in which a series of parallel, compressed air filled tubes or the like form one or more backing chambers which function as a generally rigid backing member.

BACKGROUND OF THE INVENTION

The present invention is an outgrowth of the development of an air pallet using low pressure, low cfm air flow exemplified by U.S. Pat. No. 3,948,344 entitled. "LOW COST PLANAR AIR PALLET MATERIAL HANDLING SYSTEM" issued Apr. 6, 1976, and U.S. Pat. No. 4,272,856 entitled, "DISPOSABLE AIR-BEARING PATIENT MOVER AND VALVE EMPLOYED THEREIN", issued June 16, 1981, assigned to the common assignee. Planar air pallets and air-bearing patient movers of such type employ at least a thin flexible bottom sheet for partially defining a plenum chamber, with said one sheet being perforated by way of small, closely spaced pin holes over a surface area defined by the imprint of the load, which pin holes face an underlying fixed, generally planar support surface. The pin holes open unrestrictedly to the interior of the plenum chamber and to the planar support surface. When the plenum chamber is pressurized by low pressure air, initially the air jacks the load upwardly above the thin flexible sheet, then air escapes under pressure through the minute pin holes and creates a frictionless air bearing of relatively small height between the underlying support surface and the bottom of the perforated flexible sheet.

In all air pallets, including patient movers, it is necessary to provide controlled pillowing of the thin, flexible sheet material, particularly outside the perforated surface area of that sheet to initially jack the load above the flexible sheet prior to the creation of the frictionless air bearing and to insure the ability of the air pallet to ride over surface projections on the underlying support surface. Means must also be provided within the air pallet to prevent ballooning of the thin flexible sheet or flexible sheets defining the plenum chamber whereby the plenum chamber takes a circular or near circular vertical cross section, the result of which could be the tilting or rolling of the load off the top of the air pallet. Further, when the load rests on the air pallet, prior to the pressurization of the plenum chamber the load tends to press the perforated flexible sheet into contact with the underlying support surface which prevents the entry of air under light pressure into the plenum chamber. Thus air dispersion means are required either interiorally or exteriorally of the plenum chamber to ensure pressurization of the plenum chamber.

Under certain circumstances, the load may additionally constitute a generally rigid, i.e., semi-rigid backing member. A cardboard box filled with material for transport may have the planar bottom functioning as a generally rigid backing member. Where the air pallet is formed essentially of a thin flexible sheet material bag, a bag of grain acting as the load may constitute a generally rigid backing member.

In the development of air pallets and in particular air bearing patient movers as a form of such air pallets as exemplified by U.S. Pat. No. 3,948,344, a corrugated sheet such as sheet 34 within the single chamber functioning as a plenum chamber in a patient mover formed by two superimposed thin flexible sheets 12, 14 in U.S. Pat. No. 4,272,856 may constitute both a unitary air dispersion means and a semi-rigid backing member (if needed). The semi-rigid backing member may comprise a semi-rigid sheet inserted within a cavity formed between the top thin flexible film sheet and an intermediate thin flexible sheet. Alternatively, the backing member may be formed of a series of transversely linked air pressurized tubes formed by sealing off parallel, laterally adjacent longitudinal sections of the top sheet and the intermediate sheet. Such tubes may be completely sealed and air pressurized through valves. In a flow-through system, the pressurized air forming the air bearing passes first through parallel, transversely linked tubes defined by the top and intermediate sheets and then into the plenum chamber defined by the intermediate sheet and the bottom sheet with the bottom sheet bearing the pattern of perforations over the foot print of the load. U.S. Pat. No. 4,528,704 issued to Jack Wegener and Raynor D. Johnson, co-applicants herein on July 16, 1985 and entitled Semi-Rigid Air Pallet Type Patient Mover is directed to such air pallets.

Flow-through chambers connected by succeedingly smaller sized ports within horizontally extending vertically spaced walls define a series of stacked chambers in a gas pressurized jacking structure and an air pallet including such jacking structure and forms the subject matter of U.S. Pat. No. 4,417,639 issued to Jack Wegener, a co-applicant herein on Nov. 29, 1983 entitled, "DYNAMIC GAS PRESSURIZED JACKING STRUCTURE WITH IMPROVED LOAD STABILITY AND AIR PALLET EMPLOYING SAME". Further, as evidenced in FIG. 10 thereof, such jacking structure may be formed totally of thin flexible sheet material with vertically separated chambers in communication via a gas passage whose cross-sectional area is smaller than that of the air inlet to the upper chamber thereof through the air inlet hose.

In the semi-rigid air pallet type patient mover of U.S. Pat. No. 4,686,719 assigned to the common corporate assignee and entitled "SEMI-RIGID AIR PALLET TYPE PATIENT MOVER", U-straps are sewn to the lateral sides of the patient mover structure for facilitating lateral shifting of the patient placed thereon with the plenum chamber gas pressurized and a thin air film underlying the perforated area of the thin flexible bottom sheet. The patient may be bound to the top of the patient mover via a pair of crossed VELCRO ® hook and loop material covered straps for ease in engagement and disengagement of the strap ends about the patient.

In the field of air pallets and particularly of the patient mover type those patient movers formed of multiple, thermal bonded or stitched sheets of thin flexible sheet material which incorporate a rigid or a semi-rigid sheet as the load backing member are not universally employed within the hospital or other treatment facility. The existence of the rigid or semi-rigid sheet carried within a pocket or cavity defined by two thin flexible sheets renders the assembly bulky, and adds considerably to the weight of the same. While such patient mover may perform extremely well at a certain hospital station or treatment area such as facilitating patient movement onto and from an X-ray machine, the patient mover remains at that area and is unlikely to be employed in moving the patient to and from the hospital bed remote from the X-ray area since hospital personnel resist transporting such patient mover from location to location.

The same is true where the air pallets such as patient movers are utilized by paramedics, shock trauma units or the like. As a result, recently there has been shown considerable interest in the development of soft pad or hard pad air chamber type air pallets as patient movers or as patient positioners devoid of such rigid or semi rigid sheet. In the health care field, particularly the person transported or changed in position in many cases is not truly a patient recovering from sickness but, one requiring continuous attention, such as an invalid or partial invalid. In this case, upon either transport, or positioning and maintaining the patient comfortable in a given partially upright or supine position, the possibility of a tissue breakdown exists with the need for inducing therapy during the time that the patient remains in such given positions for a significant period of time. Essentially, there exists the need for the prevention of skin breakdown which can occur within a very short time whether the patient is in a health care facility or hospital, even while on the operating table of such hospital.

The applicants have determined that there are significant differences between the rigid back air pallet and the flexible or air chamber type air pallet with a load that can flex. In the development of air pallets and air pallet-type patient movers utilizing a thin, flexible bottom sheet partially defining a plenum chamber and being perforated by way of thousands of small, closely spaced pin holes over the surface area defined by the imprint of the load and which open unrestrictedly to the interior or the plenum chamber and to an underlying planar support surface, such air pallets and air pallet-type patient movers have generally employed a rigid backing member starting with U.S. Pat. No. 3,948,344. Exceptions lie in the patient mover of U.S. Pat. No. 4,272,856, and in the patient mover illustrated in FIGS. 4 and 5 of U.S. Pat. No. 4,528,704.

Certain structural features and parameters with respect thereto play a very important part in the successful operation of an air pallet having a rigid backing member. The first consideration and operating parameter is that of load distribution. By taking the weight of the load and dividing it by the mass load footprint area in square inches, one obtains the value of the air pressure in pounds per square inch required to lift the load and to move the load on a developed air film by the escape of air from the perforations. By multiplying the width of the load times its length, one obtains the value of the footprint of the load in square inches. The plenum chamber in such structure is usually defined by the rigid backing member and the thin flexible bottom sheet bearing the perforations. The area of the plenum chamber footprint in square inches is the length of the plenum chamber multiplied by its width. The key for successful movement of the load on a developed air film by air escape from the perforations is to make the air work on the load and to control the action of the air in doing that job. By matching the footprint of the load to that of the plenum chamber pattern area of perforations, thus generally matching the area of the developed air film to that of the load, the air pallet with the plenum chamber pressurized will jack the load, create the air bearing and permit the load to be stably moved on the air pallet.

If the mass of the load is through spread through too small an area against the plenum chamber, i.e., point loading, the load may ground out the portion of the plenum chamber between that load and the underlying planar support surface causing the thin flexible sheet to bulge out around the point load application against the top of the plenum chamber. Thus, with the plenum chamber up and about the sides of the load, the load is not lifted, the air does not escape through the perforations and no effective air bearing is created.

When the load footprint is less than the plenum chamber air film footprint, a significantly greater pressure is needed to lift the load.

Successful operation of rigid backing surface type air pallets requires controlled jacking, controlled pillowing and anti-ballooning. Control of load distribution may be achieved by the use of a rigid backing member such as a board or sheet as part of the plenum chamber, or within a separate chamber supporting the load but overlying the plenum chamber. The rigid backing member distributes the load mass balanced equally over the area of the plenum chamber footprint. The control of the plenum chamber can be performed in several ways and a properly designed plenum chamber can effect several of the control functions, i.e., jacking, pillowing and ballooning.

The term "jacking" covers the act of raising the load so that air can enter into and be distributed throughout a plenum chamber, or multiple plenum chambers, and then pass out through the perforations to form the air film or air bearing while permitting the planar rigid backing surface to support the load and allow it to move on the film of air.

The term "pillowing" describes the ability of the thin, flexible sheet to deform so as to ride over or under surface irregularities in the generally planar support surface (ground, floor, etc.) without bottoming out. If the compressed air within the plenum chamber does not jack the load high enough, the rigid backing member will ground out against the thin, flexible bottom sheet and the surface irregularity (vertical projection).

The term "ballooning" covers the situation where the load is jacked or raised up so high that the load becomes unbalanced on the footprint formed by the plenum chamber. This is normally caused by the thin, flexible sheet tending to become hemispherical (where a generally rigid planar backing member acts in conjunction with the thin, flexible bottom sheet bearing the perforations to form the plenum chamber). The hemispherical configuration given to the thin, flexible bottom sheet permits it to roll about the curved surface tilting to the extent where the load may be dislodged. As may be appreciated, the pillowing control functions as an anti-ballooning means. Absent the generally rigid planar backing member, where the plenum chamber is formed of thin, flexible sheet material such as a bag, the bag will take a circular cross-section when fully pressurized, the true essence of a balloon.

Where the thin, flexible bottom sheet is tightly mounted at opposite sides to the generally rigid backing member that rigid backing member functions to control jacking, pillowing and ballooning. Where the rigid backing member is smaller than the thin, flexible bottom sheet, slack develops within the thin, flexible bottom sheet which increases the pillowing capability of the thin, flexible bottom sheet. Excessive slack leads to ballooning.

Other means have been provided for controlling pillowing, such as the lamination of additional members to a center sheet or to either the upper thin, flexible sheet or the bottom thin, flexible sheet. The addition of internal strips lying diagonally from corner to corner within the plenum chamber or vertical from face to face, control the degree of pillowing. The load itself may act as a pillowing control means. The insertion of a rigid plate internally within a thin, flexible bag acts both as a rigid backing member, a pillowing control means and under certain conditions air distribution means for insuring air pressurization of the plenum chamber with the air pallet formed principally by the bag supporting the load prior to air pressurization of that plenum chamber. The size of the blower and thus the air pressure developed within the plenum chamber may constitute pillowing control means, as may valving or gating of the air flow system entering the plenum chamber and creating the air bearing, and the stiffness or flexibility of the material used in forming the thin, flexible bottom sheet. The area of the material around the perforation pattern and between that pattern and the rigid backing member is normally the primarily pillowing control means for such air pallets. The proximity of the perforation pattern to the outside edge of the plenum chamber, the slack in the plenum chamber and the rigidity of the backing member all constitute aspects of the pillowing control.

In U.S. Pat. No. 4,272,856 for an operative air pallet-type patient mover, pillowing is controlled by having the pattern of perforations extending to the edge of the plenum chamber and the sides of the plenum chamber are purposely designed to match the head and torso of the patient from the shoulders to the hip, where the load mass of the patient is concentrated.

In U.S. Pat. No. 4,272,856, certain parameters with respect to the load, i.e., weight, patient size and load footprint, are matched to the plenum chamber area, otherwise the unit will not work or works poorly. The co-applicant herein ascertained that an air pallet plenum chamber upon pressurization tends to take a shape resulting in lateral reduction of the plenum chamber air film footprint. Since the patient's body is movable and flexes, this creates significant problems. Not only is such load not rigid, but the top flexible sheet is not a rigid member and, indeed nothing structurally is rigid. Further, only the torso and head is supported by the plenum chamber. (i.e., jacked up), and the rest of the body (legs, arms, etc.) simply drag along with the air pallet once an air bearing or air film is created by escape of air through the perforations within the thin, flexible bottom sheet. If the patient has a broken limb, this is not a small problem, but a catastrophe.

Patient loading on the air pallet and removal from the air pallet provides significant problems, as well as the ability to create a patient mover having a size to fit the patient, the bed, the portable gurney and a procedure table such as an operating table.

These problems led initially to developments exemplified by U.S. Pat. Nos. 4,528,704 and 4,686,719. However, these developments raised more questions than they provided answers. The key to solving most of the problem areas seems to the applicants to lie in the utilization of a rigid backing member, but a rigid backing member make it more difficult to place the patient on the patient mover. The patient has to be physically log-rolled way over, and almost face down to one side so that the rigid backing member is juxtapositioned to the patient, and the patient is then rolled back over so that the patient ends up supine on the patient mover. This procedure follows that of placing the sheet under a patient when on a hospital bed, but then a sheet can be folded in half and slid under the patient without turning his body excessively to one side. Such is not so for a patient mover having a rigid backing member.

Attempts were made at formulating a useful air chamber type air pallet using a flexible pad to eliminate the rigid backing member by or substituting an all-flexible sheet material structure for such rigid backing member, FIGS. 4 and 5 of U.S. Pat. No. 4,528,704 amounted to an initial approach. Generally at the same time, the applicants considered the separation of the jacking action from that of creation of the frictionless air film. This led to the development of stacked tubes, one functioning as a pure jacking chamber, and the second as a combined jacking chamber and plenum chamber. The result is a gas pressurized jacking structure with improved load stability, in which the same compressed air pressurizing the upper chamber through a dynamic flowthrough arrangement, functions in passing through the pin hole perforations of the plenum chamber thin, flexible bottom sheet, to create the air film. Such dynamic air pallet is the subject of U.S. Pat. No. 4,417,639.

In air chamber-type air pallet patient movers as exemplified by FIGS. 4 and 5 of U.S. Pat. No. 4,528,704, a phenomenon was experienced as the result of air pressurization of the tubular chambers formed by sealed sections of the upper two thin flexible sheets and the air pressurization of the plenum chamber underlying all of the upper row of tubes commonly to the intermediate thin, flexible sheet of said row of tubes. The entire unit took on a full vertical circular cross-section and attempted to approach a cylinder as seen in applicants' FIG. 1, which was termed "hot dogging". Such hot dogging was found to lead to extreme air pallet instability, with any load on the air pallet easily displaced. Applicants have determined that the pressurization of such air chamber-type air pallet is quite critical and a careful balance is required between inflation and flotation. During hot dogging, the plenum chamber takes on an almost circular cross-section in a plane at right angles to the longitudinal axis of the series of line joined tubes formed by the top thin, flexible sheet 202, the intermediate thin, flexible sheet 204 and the bottom thin, flexible sheet 206 of air pallet 200 of the drawings. This structure conforms to FIG. 4 of U.S. Pat. No. 4,528,704. A plenum chamber 208 is formed between the thin, flexible, intermediate sheet 204 and bottom sheet 206 and the sheet 206 has literally thousands of closely spaced pin holes 210 through which air escapes from the plenum chamber to form an air film or air bearing A between the thin, flexible bottom sheet 206 and the generally rigid, planar surface 212. Each of the transverse seal lines 214 joining the top and intermediate sheets 202, 204, together forming individual compressed air pressurizable chambers or tubes 216, function as hinging areas between adjacent tubes. The result of such is high instability for any load such as a patient's feet in contact with the exterior of the top thin, flexible sheet 202. It is further obvious that the single large sectional area formed by the plenum chamber 208 is without a means for controlling hot dogging and is thus extremely susceptible to the instability problem.

Further, in arriving at FIGS. 4 and 5 of U.S. Pat. No. 4,528,704, co-applicants hereof have attempted to form a useful air chamber-type air pallet. Such is hampered by a phenomenon resulting both in an instability problem and under severe conditions a loss or reduction in effective plenum chamber air film or air bearing footprint area to the extent where the air bearing cross-sectional area becomes too small to carry the load, the load may roll off the upper flexible sheet support area as the air pallet assumes a cylindrical shape and the air pallet may ground out as it loses air bearing cross-sectional area or a combination of all three adverse effects occur.

Where the plenum chamber P, FIG. 2, is of a given width W when flat and deflated, the tendency of such plenum chamber is to have that width W reduced to W the diameter of the tube when full inflated, as seen by a comparison with FIG. 3.

Another phenomenon which occurs utilizing the air chamber-type air pallets of FIGS. 4 and 5 of U.S. Pat. No. 4,528,704 is a lack of rigidity of the air chamber assembly defined by the top thin, flexible sheet 202 and the intermediate flexible sheet 204, as the result of air pressurization of all of the chambers 216 of the row of tubes and the air pressurization of the plenum chamber 208, which underlies the tube array defined by thin, flexible sheets 202, 204. While the walls of the individual chambers or tubes 216 are relatively taut, upon air pressurization of the same, whether in the sealed air pressure tubes such as the embodiment of FIG. 4 of U.S. Pat. No. 4,528,704 or the flow-through tubes 80 of the FIG. 5 embodiment of that patent, the line connections between abutting sides of the parallel row tubes 216 permit tube sectioning lines to act as hinges, and causing the unwanted hot dogging of the air pallet 200, FIG. 1. Further, while the presence of a load such as a patient and the weight thereof, depressing the upper surface of the air pallet FIG. 1 (corresponding to FIGS. 4 and 5 of U.S. Pat. No. 4,528,704) tends to resist the ballooning of the air pallet, and enhance the stability of the load. However, such structures inherently lack means for preventing significant lateral shrinking of the plenum chamber.

In view of the lack of rigidity of the air chamber type air pallets as illustrated in FIGS. 4 and 5 of U.S. Pat. No. 4,528,704, an investigation by the applicants of the various causes for suppleness in contrast to desired rigidity (in view of the attempt to substitute an air chamber or air chambers for the rigid planar backing member of the air pallet) led to the determination that rigidity of any part of an air chamber type air pallet can be achieved from solely two means, (1) varying the air pressure within the various chambers of the air pallet (the result of which tends to create ballooning, and the high air pressure was found to be undesirable to the inherent ballooning or tendency to balloon), and (2) employing a solid unbendable stiff upper sheet supporting the load, and for a point load, spreading that load over the complete surface of the unbendable upper sheet. While the unbendable upper sheet was sufficient to avoid ballooning, the desired rigidity can only come from the air pressure within or flowing through the various chambers of the thin, flexible sheet structure.

Further, in operation of the air chamber type air pallets, FIGS. 4 and 5 of U.S. Pat. No. 4,528,704, the plenum chamber being unsectionalized and linked solely to the tubular arrays at opposite ends and along opposite sides of the air pallet, such structure either creates, or enhances suppleness of the structure which prevents the row of tubes of the air pallet from acting as a substitute for the rigid backing member normally employed in such air pallet structures.

It is, therefore, a primary object of the present invention to provide an improved air chamber type air pallet of the patient mover or patient positioner type which is lightweight and which may take the form of a "soft pad" or "hard pad" type having the facility for the creation of a semi-rigid or generally rigid backing member, which eliminates the need for the inclusion of a rigid or semi-rigid sheet as a load backing member, which permits the patient to be physically moved in a relatively frictionless manner, which is formed wholly of thin flexible film or sheet material, which includes a degassing feature upon point pressure application to inherently induce therapy to the patient supported by the same, which is highly stable in operation, which readily holds the patient in a supine horizontal position, which tends to prevent spinal flexure, which may function as a body wrap to restrain the patient laterally and vertically, and which may be readily folded and transported upon depressurization of the air pressurized chambers formed by plural, locally sealed thin flexible sheets.

It is a further object of the present invention to provide improved, soft pad or hard pad, air chamber type air bearing patient movers which may be formed totally of thin flexible sheet material in multiple layer form with selective sealed pressurized air containment and/or flow through chambers by localized thermal bonded or sewn seal lines between respective sheets of a stacked sheet array, which may selectively include portions of the soft pad or hard pad air pallet with controlled rigidification for support of the patient with assured comfort, which facilitates patient positioning, which correlates the air bearing footprint to that of mass distribution of the load on the patient mover, which is particularly useful as a patient mover, which utilize a series of side-to-side linked hollow tubes subject to constant pressurized air application or continuous compressed air flow as single or plural stacked arrays of side-to-side linked hollow tubes defining a semi-rigid backing member for the air pallet, which air pressurization can be varied or maintained below that which would induce patient capillary closure, which facilitates lubrication of the patient body surface during support of the patient, which prevents lateral shrinkage of the portion of the compressed air plenum chamber forming the air film through the bottom thin flexible sheet perforated portion to prevent bottoming out of the load on the air pallet, which forms an air mattress which may be selectively rendered highly rigid as a "hard pad" or highly supple as a "soft pad", depending upon need, without removal of the patient therefrom, and which has application universally from use at the accident scene, to emergency transport from the scene of the accident to the hospital or other treatment facility, transport throughout the hospital including to and from the operating room, and as an air mattress with minimum trauma to the patient at all times.

BRIEF DESCRIPTION OF THE DRAWINGS

FIG. 1 is a vertical sectional view of an air pallet of the prior art showing the effect of unwanted hot dogging under air pressurization of a single row of linked tubes, and the single plenum chamber underlying the same.

FIG. 2 is a sectional view of a single tube prior to air pressurization thereof.

FIG. 3 is a sectional view of the tube of FIG. 2 illustrating lateral shrinkage thereof upon air pressurization.

FIG. 4 is a schematic vertical sectional view of an air chamber-type patient mover air pallet formed of two thin, flexible sheets, forming a preferred embodiment of the present invention, prior to inflation.

FIG. 5 is a vertical sectional view of the air pallet of FIG. 4, under air pressurization.

FIG. 6 is an end view of the air pallet of FIGS. 4 and 5 during placement partially beneath the patient and under air pressurization.

FIG. 7 is a similar end view to that of FIG. 6 during initiation of patient transfer, partially supporting the patient.

FIG. 7 is a further end view, similar to that of FIGS. 6 and 7, with the patient fully supported by the air pallet.

FIG. 9 is a schematic, vertical sectional view, illustrating the anti-shrink effect resulting from the utilization of small diameter side-to-side linked tubes of the two flexible sheet air chamber-type patient mover air pallet of FIGS. 4 and 5.

FIG. 10 is a schematic top plan view of a two-sheet air chamber-type patient mover air pallet, forming a further embodiment of the invention.

FIG. 11 is a schematic top plan view of yet another embodiment of the two-sheet, air chamber-type patient mover air pallet of this invention.

FIG. 12 is a schematic top plan view of a further embodiment of the invention for a simplified air chamber-type patient mover air pallet formed of a series of longitudinally spaced tubular air chambers of varying diameter.

FIG. 13 is a schematic top plan view of a further embodiment of a two-sheet air chamber-type patient mover air pallet of the present invention.

FIG. 14 is a schematic top plan view of a simple two-sheet flexible film air chamber-type patient mover air pallet forming yet another embodiment of the present invention.

FIG. 15 is a schematic representation, in sectional form, of a single chamber air pallet contrasted to that formed by a series of linked tubes and illustrating the significant increase in tangential air film footprint for the air pallet formed of a series of small diameter side-to-side linked tubes, to that of the single chamber-type air pallet.

FIG. 16 is an X-Y coordinate plot of the operating parameters associated with the air chamber-type patient mover air pallets forming various embodiments of the present invention.

FIG. 17 is a schematic top plan view of a further two-sheet flexible film air chamber-type patient mover air pallet of the present invention.

FIG. 18 is a schematic top plan view of a modified form of air chamber-type patient mover air pallet of the present invention.

FIG. 19 is a schematic vertical sectional view of a modified form, simple two-sheet flexible film air chamber-type patient mover air pallet of the present invention prior to air pressurization of the tubular chambers thereof.

FIG. 20 is a schematic vertical sectional view of the air pallet of FIG. 19 under air pressurization, taking a "cradle" position about a patient thereon and conforming to a chute supporting the air pallet and between which an air film is developed.

FIG. 21 is a schematic vertical sectional view, on an enlarged scale, of the air pallet of FIG. 4, illustrating the effect of the load and the preferred placement of the pin hole perforations within the thin, flexible bottom sheet of that structure.

FIG. 22 is a similar view to that of FIG. 21, illustrating the flattening of the tangential contact portion of the tubes with the underlying support surface and the resultant air bearing created thereby.

FIG. 33 is a top plan view of a four-sheet, thin flexible film, air chamber-type patient mover air pallet forming yet a further embodiment of the present invention.

FIG. 34 is a top plan view of a first intermediate, thin, flexible sheet of the air pallet of FIG. 33.

FIG. 35 is a top plan view of one of dual second intermediate, thin flexible sheets of the air pallet of FIG. 33.

FIG. 36 is a top plan view of a bottom thin, flexible sheet of the air pallet of FIG. 33.

FIG. 37 is a schematic, vertical sectional view of the air pallet of FIG. 33, illustrating the longitudinal seal line between the thin, flexible sheets of that air pallet, and the formation of individual air tubes or chambers thereof.

FIG. 38 is a perspective view, partially broken away, of the air pallet of FIG. 33 under air pressurization and illustrating the extent of hot dogging of that air pallet.

FIG. 39 is a schematic, vertical sectional view of a modified air chamber-type patient mover air pallet of FIG. 26, forming yet a further embodiment of the invention.

FIG. 40 is a plan view of an open frame forming a lateral anti-shrink element employable in the alternative to the rigid sheet of the embodiment of FIG. 39.

FIG. 41 is a schematic, vertical sectional view of yet a further flexible sheet air chamber-type patient mover air pallet of the present invention.

DETAILED DESCRIPTION OF THE PREFERRED EMBODIMENTS

Figure 23:
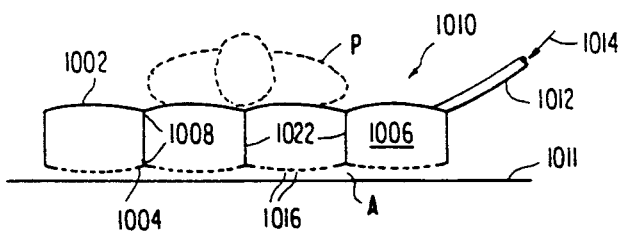
FIG. 23 is a schematic vertical sectional view of a flexible film air chamber-type patient mover air pallet, forming yet another embodiment of the present invention.

The present invention in the various embodiments described in detail hereinafter takes into account the parameters discussed within the Background Of The Invention section of this specification, and from the need to provide effective air chamber-type air pallet patient movers permitting the loading of the patient thereon and the unloading of that patient therefrom without the trauma and discomfort caused by the attendent log rolling of the patient to accomplish those actions. The flexible backing chamber air pallet involves, in addition to jacking, pillowing and ballooning other critical phenomenon and operating parameters which must be controlled. The air pallets of the invention additionally require means for preventing the hot dogging phenomenon discussed above. The applicants have determined that the existence of singular or multiple large sectional areas which cause a major portion or the totality of the air pallet, with the singular chamber or multiple linked chambers inflated, to take a true circular cross-sectional configuration results in instability to the load and trauma to the patient. Keyed to the field of patient transfer, the present invention in the several embodiments as set forth hereinafter, provides a solution to the problem of placement of a patient onto an air chamber-type air pallet patient mover, which eliminates undesirable log rolling, and possibility of severe spinal cord injury to the patient.

Referring to FIGS. 4 and 5, one embodiment of an air chamber-type patient mover air pallet 310 is formed of two thin, flexible sheets 302 and 304 which are sewn together about all four edges or heat sealed via spaced longitudinally extending seal lines 308 to form individual side-by-side parallel chambers 306. The individual chambers or tubes 306 which tend as per FIG. 5 to take a circular cross-section when air pressurized via a source of compressed air indicated by arrow 314 applied to the chambers, are, in this case for example, connected in series through an air inlet tube 312. To create an air bearing A beneath the bottom thin flexible sheet 304 thousands of pin hole-type perforations 316 are provided within the bottom sheet 304, in this case preferably limited to the central area of respective tubes or chambers 306. The two-piece patient mover air pallet consists, therefore, of an imperforate upper, thin flexible sheet 302 attached at intervals to a lower, thin flexible sheet 304 with a plurality of perforations 316 within the bottom thin, flexible sheet and an air inlet tube 312 communicating to all chambers or tubes 306. The patient P is moved onto the patient mover air pallet by folding the air pallet 310 about its longitudinal center line, FIG. 6 defined in this case by the middle longitudinal seal line 308, prior to air pressurization of chambers 306 with the patient lying in the supine position. By wedging the folded two-piece air pallet with the perforations 316 facing each other, the folded, deflated patient mover air pallet 310 can be placed under the patient much in the same manner that a folded sheet can be placed under a patient when remaking the bed without moving the patient from the hospital bed. Such may be accomplished with relatively little movement of the patient.

Upon air pressurization of plenum chambers 306, the patient is jacked to some extent, an air bearing is created at A, FIG. 6, between the folded over halves of the patient mover air pallet 310, and the patient P is caused to move up onto the imperforate upper thin, flexible sheet 302, FIGS. 6, 7. The patient can then be moved back onto a gurney, backboard B or the like, with or without environmental control sheets, FIGS. 7, 8 as support equipment, and as needed or desired.

By gently inflating the patient mover air pallet 310, it may be pulled by one transverse edge across itself with frictionless movement resulting from the application of pressurized air to the interior of the chambers or tubes 306 which function as plenum chambers. The air bearing A is created as a result of compressed air discharging from the plenum chamber through the pin hole perforations 316 which open unrestrictedly interiorly and exteriorly of the patient mover air pallet 310. At the same time by jacking, the patient's body is lifted evenly. The air pallet 310 includes means for controlling pillowing of the air pallet plenum chambers formed by the linked tubes, and the patient is eventually totally supported by the patient mover air pallet. The patient may then travel across an environmentally controlled sheet onto backboard B.

Referring next to FIG. 9, and comparing that figure to the result of inflation of a flat, deflated single chamber body, FIGS. 2 and 3, the applicants have ascertained one of the operating parameters and key aspects of the patient mover air pallets of the present invention. Where the desired lateral width W, FIG. 2, of an air pallet is to be maintained, the air chamber pallet is composed of or built up of many smaller diameter sectional membranes linked together resulting in a significant reduction in lateral width, or shrinkage. Width W'', after air pressurization of chambers 306 of the patient mover air pallet 310 of FIG. 4, is significantly larger than the width W' of the single inflated chamber 220, FIG. 3, whose diameter D when fully inflated is approximately two-thirds of its flat, deflated width W, FIG. 2. Note that the diameter D' of each chamber 306 in FIG. 9 is significantly smaller than the diameter D of the single chamber 220 structure when inflated. FIG. 3.

In terms of desired flow paths for compressed air under pressure moving through the various tubes or tube sections of a two-ply air pallet formed solely of two thin, flexible sheet material heat sealed in localized, linear fashion, FIGS. 10, 11 and 12 are exemplary of seal lines forming parallel flow paths from a single air inlet. In FIG. 10 air pallet 410 has compressed air source 414 feeding air via air inlet 412 to parallel tube plenum chambers or sections 416, each linked by flow reverse turns 420 defined by seal lines 408.

In FIG. 11 a singular flow path 520 starting from the inlet 512, of modified spiral form by seal lines 508 between two flexible sheets forms a unitary plenum chamber air pallet 510. In FIG. 12, the two sheet air pallet 610 uses a plurality of short length parallel unevenly spaced seal lines 608 transverse to the longitudinal extent of the air pallet 610, permits parallel flow paths to open from right angle flows along opposite longitudinal edges of the air pallet which longitudinal paths form air flow manifolds 622 from inlet 612 from air source 614. The tubes or plenum chambers 616 which run transversely, and are of varying width, meet the specific mass concentration areas of the load supported thereby (human body).

FIGS. 13 and 14 show additional embodiments of the present invention, specifically directed to two-sheet air chamber-type patient mover air pallets, as at 710 and 810 respectively. In FIG. 13, compressed air, as indicated by arrow 714, enters inlet 712 for parallel flow through spiral-like dual plenum chambers to laterally opposite sides of the air pallet 710 as defined by seal lines 708 constituted by vertical and horizontal ribbing of the chambers defined thereby. The distance between parallel longitudinally extending ribbing, i.e., seal lines, can be altered, graded, enlarged, or decreased to control lift, load support, cradling, etc. of the patient to meet the environment needs for the patient mover air pallet.

It is apparent that by creating a number of small diameter chambers or tubes in a single linked row in accordance with the superpositioning of air pallet 310, FIG. 4, on a large circle C to form a chamber 220 equivalent to that of FIG. 3, D' is many times smaller than the original D associated with chamber 220. The hot dogging of the resulting structure is considerably reduced and provides effective control in supporting a load thereon, particularly a patient P. Upon close examination, the applicants have determined another change which takes place to the bearing surface of a cylindrically-shaped object such as a plenum chamber bearing on the underlying fixed support surface such as surface 311 where that object is formed of a thin, flexible sheet. Even without loading, the large circle C assumed to be the cross-section of an elongated tube, air pressurized and formed of thin, flexible sheet, will have an appropriate footprint when flattened against the underlying fixed support surface 311 spreading from its contact point of tangency at the center of the circle C. In FIG. 15, the large circle C footprint occupies a width or dimension X which is significantly smaller than the potential tangential air film footprint X', as represented by the same extreme tangential contact point for the outermost small diameter D' tubes of the patient mover air pallet 310 superimposed on the large circle C, FIG. 15. By dividing the circular circumference so as to form a multiplicity of smaller circles of a diameter D' as exemplified by the first embodiment of the present invention, FIG. 4, i.e., patient mover air pallet 310, the combined circumference of the smaller tubes still has the same circumference as the big circle C, but the potential footprint area of the load can be significantly larger. The applicants have ascertained that not only is there control of the hot dogging tendency of such air chamber-type patient mover air pallets, but the present invention maximizes the load footprint area and indirectly the perforation area of the individual plenum chambers defined by the separate tubes or chambers 306, providing the air film or air bearing A. The control is therefore of the shrink of the load footprint area in contact with the supporting surface of the plenum chamber or chambers, which in turn provides the ability of the air pallet to support the load P. In addition, FIG. 15 represents a further phenomenon or operating parameter ascertained by the applicants. Instead of the large volumetric area of the lower half of the circle C (beneath the superimposed air pallet 310) consisting of laterally edge-abutting tubes or chambers 306, such is minimized (essentially eliminated), the result of which is stabilization of the air pallet against hot dogging. Additionally, as will be seen hereinafter, the individual tubes 306, due to the presence of the load P and on the basis that the chambers or tubes 306 constitute plenum chambers through which air escapes via pin holes 316 to form the air bearing or air film A between the thin, flexible bottom sheet portions of the plenum chambers bearing the perforations, flatten to form small footprint areas corresponding to the large circle C footprint X of FIG. 15. The tubes 306 perform the necessary pillowing control and anti-ballooning. The applicants have additionally determined that by limiting the area of the thousands of pin hole-type perforations to that surface area of each plenum chamber or tube 306 which is flat and in near contact with the planar rigid support surface 311, essentially only the flat surface area having perforations 316, the footprint of the air film for the patient mover air pallet 310 conforms to that of the load P.

FIG. 16 is a rendition of an X-Y coordinate structure and depiction of what occurs in FIG. 15, evidencing the operating parameters of a single, very large plenum chamber C in contrast to an air pallet formed of multiple linked tubes of two-sheet form constituting plenum chambers and functioning to jack the load, support that load, and to produce the underlying air film A, FIG. 5. The plenum chamber air film extends along the X axis of the plot, with the plot illustrating vertically upward from that X axis, in respective order of magnitude, jacking, pillowing, ballooning and hot dogging control factors or parameters of the air chamber-type patient mover air pallets of the present invention. As one phenomenon reduces, one or more increase. The applicants structures of the present invention control the changes to maximize the air film footprint with the air chamber or chambers preferably taking the form of elongated cross-sectional rectangles rather than being of elongated hot dog shape, i.e., circle C, FIG. 15.

The aspects discussed above, particularly with respect to FIGS. 15 and 16 are keyed to the necessity for reduction in lateral shrink and maximum retention of the air film surface with minimal loss of the air bearing A developed between the thin, flexible bottom sheet of the air pallet and the underlying rigid planar support surface 311.

In that respect, it is apparent that shrink does not occur along the axis of a tubular membrane, but perpendicular to that axis. Mathematically shrink measures out to be about one-third or a function of $\pi$. From FIGS. 10-14 the control of the lateral shrink, parallel to the developed air film A and its structural orientation with respect to the position of the load on an air pallet is the key to the air pallet's performance. An air pallet formed of two thin, flexible sheets locally heat sealed to each other for movement of a supine body permits the basic unit to have a series of tubes running in the same direction, parallel to the fold line. The size of the tube diameter determines the height of the inflated unit and is preferably kept to a relatively small value. By using a combination of tubes, some perpendicular to others, control of shrink occurs in both directions, and such tube arrangement performs an anti-shrink action.

FIG. 17 illustrates schematically, a two-sheet air pallet similar to that shown in FIG. 4, using like numerals for like elements, with tubes 306 forming plenum chambers defined by seal lines 308, all being parallel and in line with flow entering inlet 312 from a compressed air source 314 flowing transversely across the air pallet 310 to the side opposite the inlet 312 and with parallel air flows through the individual tubes 306 of the tube array.

FIG. 18 illustrates an air chamber-type patient mover air pallet 910 of simple two flexible sheet form with a single air inlet 912 receiving compressed air from source 914 and with flow occurring within tubes 906 along opposite longitudinal sides, while tubes 922 extend transversely parallel to each other, from one longitudinal end to the other, between longitudinally extending tubes 906 to opposite sides thereof, all receiving compressed air from a single source 914. In all of the embodiments of the invention using two thin flexible sheets, the multiple tubes constitute plenum chambers described above and the thin flexible bottom sheet, in each instance includes a pattern of thousands of closely spaced pin hole perforations which are not shown for simplification of the views.

Variations occur by separation of flows into multiple chambers of serpentine or spiral form to prevent the multiple thin, flexible sheet structure from reaching its free cylindrical shape in contrast to that of a singular tubular unit.

Thus, various combinations of fabrication and joining of two sheets of simple two-sheet air chamber-type patient mover air pallets may be employed, accomplishing different end results, but all based on the basic principles discussed in the creation of the air pallet 310, FIG. 4.

Reference to FIGS. 19 and 20 show a modification of the basic two-sheet air pallet 310 of FIG. 4. In this case, the air pallet 310' otherwise corresponding to that of FIG. 4 is again formed of a thin flexible top sheet 302' and a thin, flexible bottom sheet 304' being heat sealed or otherwise bonded or sewn along four sides and longitudinal lines 308' to form individual tubes or chambers 306'. However, the lateral distance between lines 308' of attachment for the lower sheet 304' is much larger than that for the upper sheet 302' so that upon inflation, the air pallet 310' tends to curl upwardly into a U-shaped form, see FIG. 20, and thus cradle a patient P. With air pressurization of the individual plenum chambers 306' the inverted arch tends to adversely alter the air bearing A created between the thin, flexible bottom sheet 304' and the underlying rigid planar support surface 311' as air exits from pin holes 316'.

A U-shaped chute 311'a, shown in dotted lines maintains the air bearing or air film A if curved corresponding to the inverted arch, FIG. 20. If, as shown, the lower sheet has excess material accumulated between the joined lines compared to the upper sheet, then upon inflation of the chambers a "cradling" phenomenon takes place. To the contrary, if more slack is accumulated between the upper sheet seal lines then the air pallet will arch upwardly.

As touched on briefly above, turning to FIG. 21, where the simple two-sheet air chamber-type patient mover air pallet 310 takes the form of plenum chamber tubes 306 which are joined by longitudinal seal lines 308 and under air pressurization, the placement of the load (patient) P on the air pallet causes a flattening to occur to the circular cross-section tubes, both at the top and at the bottom. Where the cylindrical tubular members face the underlying fixed support surface 311, each will tend to flatten out over a limited surface area of the circular arc. Depending upon the weight of the load P and the relative air pressure inside the tubes, the extent of flattening will vary. The greater the surface area of the thin, flexible bottom sheet in near contact with the underlying support surface, the greater the lift and area for air film development through the perforations 316 facing the underlying support surface and the greater the tendency of the air pallet to function at a lower operating air pressure. Additionally, as per FIG. 22, there is less longitudinal channel voids V to allow the air to escape along the axis for the tubular joints defined by the seal lines 308 without providing any lift or developed air film A. Applicants have determined that by limiting the area of perforations to that area normally flattened within the thin, flexible bottom sheet 304, as at 318 for each of the tubes or plenum chambers 306 the effective footprint of the developed air bearing or air film A remains substantially equal to that of the footprint of the load P (patient) supported by the air pallet 310. Applicants have determined that by using a great number of small diameter pin hole-type perforations, i.e., literally thousands of perforations, there is more effective lift from the escaping air through the perforations 316. To obtain maximum lift, using minimum air pressure it is desirable to have as large a tangential flat area as possible for each of the tubes 306 along the fixed planar support surface 311, to obtain maximum lift. If the perforated area is limited to the flat area for each of the tubes 306, then the effective surface area of the developed air film, i.e., the footprint of the air film is maintained approximately equal to that of the load P.

From the discussion above and as it relates to the embodiments of the invention described in detail above, and those described hereinafter, it is obvious that a large singular tubular structure is not an effective way to either jack a load, or maintain an air film large enough to move the load while providing stabilization of the load riding on an air pallet particularly one of the air chamber-type. By utilizing a series of small diameter tubes as a lateral array with those tubes functioning as plenum chambers, by restricting the supporting surface of the plenum chamber which is flattened in contact with the underlying relatively fixed planar support surface, and by limiting the area of perforations to such area, maximum lift is achieved and maximum film lubrication area for the load thereby resulting in the largest overall efficiency for an air pallet operating under the least volume and pressure of air input to that plenum chamber for jacking the load, for controlling pillowing for creation of the air bearing and for stabilization of the load, with restricted air loss between the plenum chambers creating the developed air film.

An important operating parameter which is critical to successful operation of air chamber-type patient mover air pallets (and to such air pallets employed generally in material handling) involves the rigidity of the structure handling the patient or other load. Rigidity can only be achieved from two means as discussed previously: the air pressure that develops pillowing and which leads to ballooning and the weight of the load itself.

The present invention also resides in the appreciation that rigidity must come from the pressurized air filling or flowing into and through a flexible multiple tube structure and is accomplished by chambering or tubular configurations which are formed of or include means which provide lateral rigidity and additionally resist the downward force created by the load on the top of the air pallet. Due to the possibility of induced trauma to the patient during patient moving, these needs must be accomplished while avoiding point contact between the patient and a rigid surface, the result of developed bending moment while utilizing assemblies that form semi-rigid or near rigid members when air pressurized.

The development of operable two-sheet, soft air chamber-type patient mover air pallets in the form shown in FIG. 4 and in accordance with variations thereof, through FIG. 22 have led to successful creation of such air pallets utilizing the two thin, flexible sheets to form a single row of chambers or tubes which are physically linked or joined, and which include means defined by a third sheet or its equivalent to form semi-rigid backing chambers as the equivalent for the rigid sheet or semi-rigid sheet of the earlier air pallets discussed in the Background Of The Invention portion of this specification. In FIG. 23, an air chamber-type patient mover air pallet, indicated generally at 1010 is formed of a thin, flexible upper or top sheet 1002 physically separate from a thin, flexible bottom sheet 1004, but linked by vertical imperforate stringers 1022 which are sealed or otherwise joined at opposite ends by seal lines 1008 to sheets 1002, 1004 to thereby define linked plenum chambers or plenum chamber sections 1006 open to each other at the ends or otherwise. Sheet 1004 has perforations 1016 through which compressed air from source 1014 after entering the plenum chambers through the plenum chamber 1006 to the extreme right and by flowing therebetween seeks escape through the pin hole-type perforations 1016 to form air bearing or air film A between the bottom thin, flexible sheet 1004 and the generally fixed underlying support planar surface 1011. Stringers 1022 form vertical walls which are equally pressured on opposite sides to render those stringers or walls 1022 taut as the result of air pressurization. Such stringers or walls 1022 are required at laterally spaced locations across the full width of the plenum chamber or at least the area of perforations forming the underlying air bearing A. Contrary to the embodiment of FIG. 4, not only is the air pallet formed of additional members other than the top thin, flexible sheet and the bottom thin, flexible sheet, but the junctures between the sheets do not form "hinges" as occurs for seal lines 308 joining the top and bottom sheets 302, 304 of the embodiment of 310, FIG. 4. To the contrary, by utilizing stringers or vertical walls 102 which are subject to air pressurization on opposite sides, such members as a result of inflation function as a "I" beams. The same has been found true where air pallets of the air chamber-type are formed where the defined chambers are commonly not plenum chambers through which air escapes via the pin hole perforations 1016 to define the air bearing A, but are jacking chambers for jacking the load and constitute an array above the plenum chamber and separate therefrom. The present invention is therefore to a significant extent directed to air chamber-type air pallets, where multiple tubes or chambers are formed of the thin, flexible sheet material, with the tubes being joined at two points which are some degrees apart on the circumferences of the tubes.

The applicants have determined that when two tubes are attached at a single point (a line over their length) and then inflated they readily bend around the point of attachment with that point of attachment, or line of attachment acting as a linear hinge. To the contrary, tubes which are attached at two points, particularly in the order of 90° apart on their circumference, when inflated, will form a rigid member between the attachment area, i.e., a common wall which resists hinging and which functions as an I-beam.

In accordance with the embodiment of FIG. 23, which in all other respects is similar to the embodiment of FIG. 4, where many tubes are fastened side-by-side over an extended width, a rigid air platform is created by the tubes constituting plenum chambers and developing the air film A. Similarly, tubes fastened side-to-side over a circumferential extent of a number of degrees will support a load and jack the load, irrespective of whether they are functioning as plenum chambers bearing perforations to create the underlying air bearing or merely air backing chambers.

Figure 24:
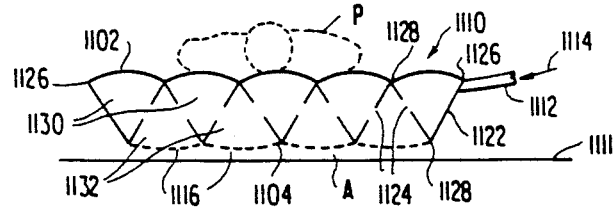
FIG. 24 is a schematic vertical sectional view of an alternate form of three-sheet, air chamber type patient mover air pallet of the present invention.

Turning next to FIG. 24, a further embodiment of the invention is indicated generally at 1110. In this embodiment, which again is a variation of the embodiment of FIG. 4, the air pallet 1110 is formed of three separate, thin, flexible sheets, a thin, flexible top sheet 1102, a thin, flexible bottom sheet 1104 bearing areas of pin hole type perforations 1116 which are closely spaced and in accordance with the prior embodiments, and a thin, flexible intermediate sheet 1122. The intermediate sheet bears a number of holes or air passage ports 1124, permitting the air to move from chamber to chamber. The thin, flexible bottom sheet 1104 is heat sealed transversely only at opposite side edges, as at 1126, to the top sheet 1102. The interposed intermediate sheet 1122 is heat sealed along longitudinal lines as at 1128, alternately to the top and bottom sheets. Thereby, the top thin, flexible sheet 1102 and the intermediate thin, flexible sheet 1122 form an upper row of tubular chambers 1130, which alternate with and are laterally offset from a lower row of tubular chambers 1132 formed by heat sealing intermediate thin, flexible sheet 1122 and bottom sheet 1104. The upper row chambers 1130 are backing chambers or jacking chambers since they function to jack the load and act similar to the generally rigid backing member of U.S. Pat. No. 3,948,344 to support the load, and the lower row chambers 1132 are plenum chambers with the thin, flexible bottom sheet being perforated at 1116 for the three adjacent lower row chambers 1132 underlying the load P. In the basic structure shown in FIG. 24 an air inlet tube 1112 receives compressed air from a source indicated by the arrow 1114 with this air first passing through one of the upper row chambers 1130 and then entering the laterally adjacent lower row chamber 1132, in alternating sequence rendering a portion of the thin, flexible intermediate sheet 1122 rigid, i.e., like an I-beam. As a result, these tubes do not take a circular or oval configuration, but, rather, a triangular cross-sectional configuration. As will be seen, the lines of attachment for the thin, flexible bottom sheet with respect to the upper row of chambers 1130 are at spaced transverse positions defined by seal lines 1128, uniformly over the transverse width of the plenum chamber, providing the desired rigidity to the structure while simultaneously limiting the lateral shrinkage of the developed air film A relative to the footprint of the load P (patient). Additionally, the air pallet of FIG. 24, due to the lateral offsetting of the tubular chambers 1130, 1132, insures, that irrespective of deflation of any one of these chambers for either the top row or bottom row, the patient P will not ground out against the underlying generally rigid planar support surface 1111. Thus, no point contact occurs between the patient with resulting trauma and the tendency to create bed sores. Additionally, the upper row of chambers 1130 which do not function as plenum chambers, constitute a row of thin, flexible sheet material backing chambers of generally rigid form as a substitute for the rigid backing member employed in a significant number of air pallets developed by one or more of the applicants herein, both in the area of material moving and more specifically the patient mover field.

Figure 25:
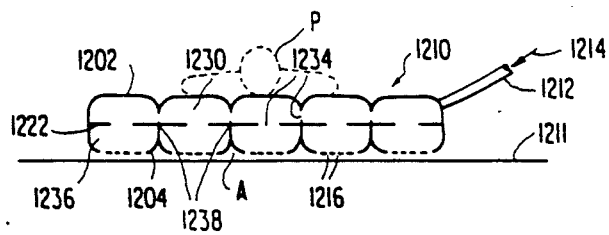
FIG. 25 is a schematic vertical sectional view of yet a further embodiment of the invention in the form of a three-sheet, flexible film air chamber-type patient mover air pallet with an air reservoir feature for preventing complete, collapse of any one of the segmental plenum chambers incorporated therein.

Referring next to FIG. 25, an air pallet 1210 is illustrated as supporting a load P as a further modification of the basic air chamber-type patient mover air pallet formed by three thin, flexible sheets, an upper or top thin, flexible sheet 1202, a bottom thin, flexible sheet 1204 and an intermediate thin, flexible sheet 1222. The upper and intermediate sheets form backing chambers 1230. The intermediate thin, flexible sheet 1222 and the bottom thin, flexible sheet 1204 form a series of separate plenum chambers 1236 when air pressurized from a source of compressed air as at 1214 entering inlet tube 1212 to one of the upper chambers 1230. Suitable ports are provided as indicated at 1234 for communicating the chambers and permitting air flow to pressurize the upper row chambers and to enter the plenum chambers of the lower row, pressurize the same, and exit through the thousands of pin hole-like perforations 1216 within the thin, flexible bottom sheet 1204. An air film A is developed between the bottom thin, flexible sheet 1204 and the generally rigid support surface 1211 underlying the air pallet.

There are two aspects to this embodiment which are important. First, it is seen that the thin flexible bottom sheet 1204 and the thin, flexible top sheet 1202 are jointed commonly to the thin, flexible intermediate sheet 1222 at uniform locations transversely across its width, as by seal lines 1238. Secondly, there is sufficient slack within the thin, flexible bottom sheet 1204 to provide plenum chambers 1236 of sufficient volume or reservoir of air to insure adequate pressurization for the passage of the air pallet over irregular surfaces or narrow voids without bottoming, while providing an anti-shrink construction via the common walls of the upper row of chambers 1230. It is noted that some of the ports 1234 extend through the common vertical walls joining adjacent upper row backing chambers 1230. The slack constitutes additionally the pillowing means for controlling the jacking, along with the thin, flexible sheet material defining the upper row of chambers which function to jack the load and to form the equivalent of a rigid backing member. i.e., a series of backing chambers 1230.

Referring to FIGS. 26 through 38 inclusive, a further embodiment of constant pressure sealed chamber, hard pad air pallet, indicated generally at 10 is shown, being utilized, preferably as a patient mover. It is formed by superpositioning four thin flexible sheets of plastic film or a woven plastic impregnated fabric material of rectangular form in a stacked array, and thermal bonding the sheets together about the lateral edges thereof with the exception of at least one air input opening between the third and fourth sheets to permit air pressurization of a plenum chamber defined by the third and fourth sheets of the stacked array. The top or first thin flexible sheet indicated generally at 12 overlies in order, a second sheet indicated generally at 14, a third sheet indicated generally at 16, and a fourth, bottom sheet indicated generally at 18. As evidenced in FIG. 31, which is a schematic representation in which the sheets are vertically separated from each other, the dotted vertical lines denote seal lines in which the thin flexible sheets 12, 14, 16 and 18 are locally sealed to each other along elongated parallel lines extending from one, foot end 20 of the air pallet 10 to the other, head end 22, FIG. 26. Sheets 12, 14, 16 and 18 of rectangular plan configuration are all of the same length but only sheets 12, 16 and 18 are of the same width. Intermediate sheet 14 may be somewhat narrower for purposes which will be apparent hereinafter. In creating the assembly, the purpose of stacking is to form individual sealed chambers or tubes which extend longitudinally from one end 20 towards the other 22. The bottom sheet 18 includes a rectangular perforated area indicated generally at 24 being located within the center of bottom sheet 18, inwardly from both ends and from opposite sides, formed of literally thousands of closely spaced, small diameter holes or perforations 26 of near pin hole size. The perforations 26 are similar to those of U.S. Pat. No. 4,528,704. Since the air pallet 10 may be employed in a hospital environment, a nursing home or resident home, it may be of a woven nylon fabric such as a 70×100 denier 3.0 ounce square yard waterproof, vapor-permeable nylon twill. One side may be coated with ZEPEL ® waterproof coating by DuPont and an appropriate anti-static agent. The other side may be coated with approximately 1¼ ounce/square yard breathable tapable urethane and a suitable bacteria stat agent. Of course, the nature of the thin flexible sheet material making up the air pallet 10 as well as the other embodiments of the invention herein may vary depending upon the environment of use and the need for a special function or characteristic property for a given sheet or sheets making up the specific air pallet in question as well as the nature of forming seal lines between sheets.

Line sealing between respective sheets 12, 14, 16 and 18 may be effected by conventional thermal bonding techniques using linear heat application (under appropriate backing) on respective sides of the multilayer flexible sheet array. For the embodiment of FIGS. 26–32, line sealing occurs along laterally spaced longitudinal seal lines 28, longitudinally inwardly of both air pallet ends 20, 22, between sheets 16 and 18 in accordance with the pattern shown in FIG. 29.

Next, a second, intermediate sheet 14 which is of shorter width than that of sheets 16 or 18 is placed on sheet 16. Further, linear thermal bond areas are effected to form seal lines 30 as per FIGS. 27 and 31 at positions laterally offset from the thermal bond seal lines 28 between sheets 16 and 18. Two of the thermal bond seal lines are immediately adjacent to the lateral edges 14a of thin flexible sheet 14. The last set of longitudinally extending thermal bond seal lines 28 are effected in accordance with the pattern shown in FIG. 27 initiating from top sheet 12, evenly spaced laterally from each other and including seal lines adjacent opposite lateral edges 12a of that top sheet. Thermal bond longitudinal seal lines 32 are formed by and between top sheet 12, the second intermediate sheet 16 and bottom sheet 18 at lateral edges of the air pallet 10. Inwardly of the edges, seal lines 32 are effected at spaced lateral positions between sheets 12 and 14; laterally offset from seal lines 30 between sheets 14, 16. Transverse thermal bond seal lines 34 are required at both ends 20 and 22 of the air pallet 10 through all four sheets 12, 14, 16 and 18. In some respects, the embodiment of the invention of FIGS. 26 through 32 inclusive relates to the air pallet of FIG. 4 of U.S. Pat. No. 4,528,704. In that respect, the top sheet 12 is provided with a air input or intake valve indicated generally at 36, FIG. 26, which may be a normally closed flap type air intake valve conventional to this art. Such valve is shown schematically at 36 in FIG. 26 and FIG. 31. In order to effect a constant pressure, compressed air pressurization of the tubes, upper section 40 of air pallet 10 defined by sheets 12, 14, 16, in contrast to the lower section 42 formed by the plenum chamber 68, sheets 16 and 18, the compressed air may freely circulate to, between and through transverse channels at the ends of seal lines 32 between sheets 12 and 14. Two rows of holes 38 are provided within the first intermediate sheet 14, near respective opposite ends of the sheet, spaced between respective longitudinal seal lines 30 for sheets 14, 16 so that air pressurization at constant pressure may be effected for the chambers or tubes created by sheets 14 and 16 and the longitudinal seal lines 30 therebetween. The effect of particular longitudinal seal lines 30, 32 is to create an upper row of sealed chambers or tubes from left to right at 44, 46, 48, 50, 52 and 54 respectively, which are laterally offset from integrated, second row chambers or tubes 56, 58, 60, 62 and 64 defined by seal lines 30 sealing sheets 14, 16.

Figure 32:
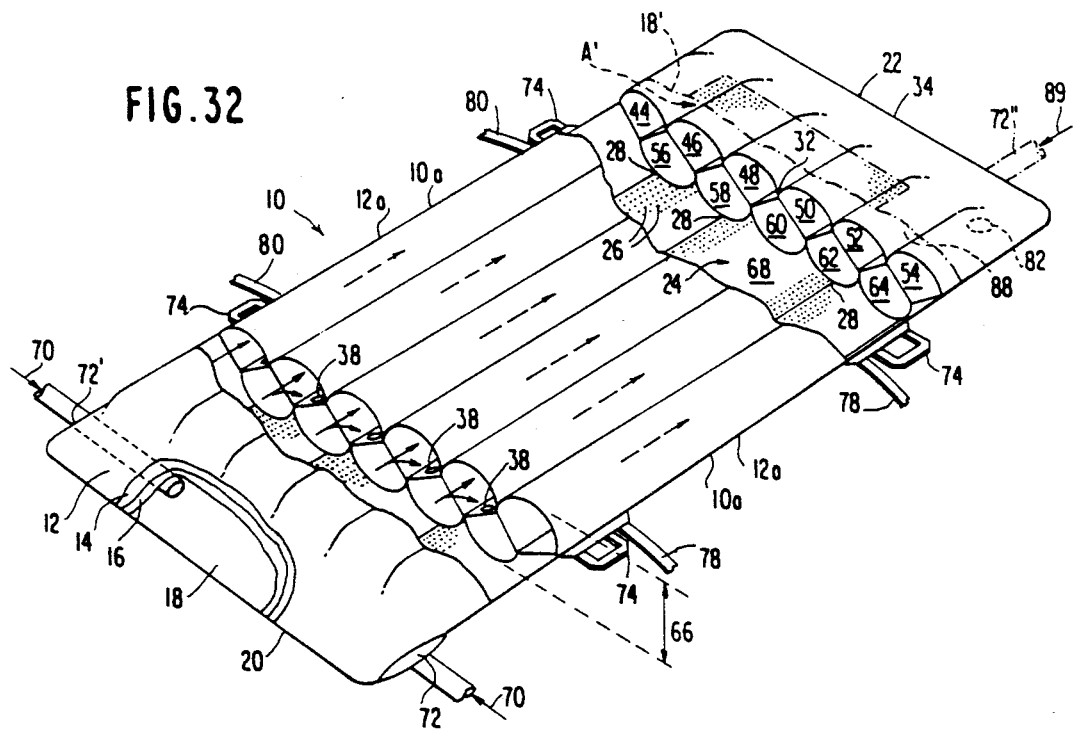
FIG. 32 is a perspective view, partially cut away, of the air pallet of FIG. 26 after inflation, and illustrating in dotted lines a fifth, thin, flexible sheet to form a second air bearing at the top of the air pallet.

Upon air inflation, as seen in FIG. 32, by the lateral offsetting of the tubes of adjacent rows of tubes by the intermediate spacing of seal lines 30 and 32 between respective sheets 14, 16 and 12, 14, a series of common walls rendered rigid upon air pressurization of the chambers result in the creation of a semi-rigid backing member 66. For air pallet 10 formed by the two rows of integrated tubes, the offsetting of the lower row of tubes or chambers from that of the upper row and the use of common walls formed by the same sheet for an upper row tube and lower row tube constitutes both a means for reducing lateral shrinkage of the plenum chamber portion bearing the perforations 26 creating the air bearing A and a means for rigidifying the air pallet. It is the perforated area 24 defined by perforations 26 which creates the footprint of the air bearing or film A, which must be correlated to the footprint of the load formed by the mass of patient P supported by the top thin flexible sheet 12. Air under pressure, as from a source indicated schematically by arrow 70, FIG. 32 is applied to the air input or air inlet valve 72 in the same manner as that effected at 60, and via inlet pipe 50 in U.S. Pat. No. 4,528,704, FIG. 2. Alternatively, a flap type inlet valve 72' to the opposite side, FIG. 32, may be employed for that purpose. Additionally, the air pallet 10 includes, at two longitudinally spaced positions on respective sides 10a of the air pallet 10 and integrated to the stack of sheets, U-shaped hand-holds 74 coupled thereto via a common base strips 76. Base strips 76 may be thermal bonded or otherwise sealed to the stack of sheets 12, 14, 16 and 18, and function as supports for body straps 78, 80, one adjacent to each of the hand-holds 74. Straps 78, 80 may include, respectively, VELCRO ® cooperative mating hook and loop type fastener strips such as those set forth in U.S. Pat. No. 4,686,719, at 78 and 80.

It should be appreciated that for the air pallet of FIG. 4 of U.S. Pat. No. 4,528,704, the existence of the single array of side-by-side coupled hollow tubes, the air pallet formed thereby shrinks laterally to a significant degree during gas (air) pressurization of the tubes. This results in a slackening of the thin, flexible bottom sheet 18, and the possible rendering of the air pallet inoperable, due to the tendency for the air pallet partially formed thereby to balloon.

The air pallet 10 of the present invention is characterized by means limiting lateral shrinkage of the portion of the plenum chamber 68 beneath the footprint of the load, as defined by the mass distribution of the patient P, particularly over the lateral width of air bearing A. In the case of the embodiment of FIGS. 26-32, and as shown particularly in FIG. 32, the thin, flexible sheet 18 as a result of the existence of longitudinal seal lines 28 sealed to respective faces of sheets 16, 18 defining the bottom row of chambers 56, 58 and 62, 64, excess slack is eliminated within the perforated area of the thin, flexible bottom sheet 18. The footprint of the air film A then matches or substantially matches the footprint of the load P, as a result of the constant pressure maintained within chambers 44-64, inclusive, of the dual rows of chambers. The full width of sheet 14 acts to form the common walls for all tubes of the upper row and all tubes of the lower row, which common walls are rendered taut and rigid under tension, due to full pressurization of tubes 44-64.

In the embodiment of FIGS. 26-32, it is preferred that the upper section 40 of the air pallet 10 include a pressure relief valve as at 82 for limiting the air pressure in tubes 44 through 64. Under certain circumstances, the air pallet 10 may include a further thin, flexible sheet 18', as shown in dotted line, FIG. 32, sealed longitudinally along the sides thereof at 84 to the outer edges of the top sheet 12, and linearly at 86 to certain of the chambers or tubes such as 46, 52. An air input valve 72 similar to that for the lower section 42 permits the compressed air pressurization of an upper plenum chamber 88. Further, the fifth thin, flexible sheet 18' in the proposed modification of FIG. 32 includes a central perforated area 24' which mirrors that at 24 of the bottom sheet 18. An air bearing A' may be created beneath patient P upon pressurization of the upper plenum chamber 88 via compressed air from a source indicated by arrow 89, either alternatively or simultaneously with air bearing A from source 70. Such structure may be used with a tent (not shown) to supply a medicament in vapor form about the patient with said tent set over the air pallet 10.

The pressure relief valve 82 automatically maintains the pressurization of the tubes or chambers within the upper section 40 of the air pallet below 32 mm of mercury pressure to prevent patient capillary closure. Under such conditions the patient is in therapy, and the function of the pressure relief valve is to regulate the pressure independently of the weight of the patient with the pressure relief valve preferably set to open at 30 mm of mercury (preset for valve 82). This is particularly desirable where the air pallet 10 functions as an operating room mattress pad. When patients are in the operating room in a fixed, supine position, skin breakdown can develop within a very short period of time. The air chambers become near rigid under an air pressure of 32 mm of mercury, and air pressurization at that level tends to prevent spinal flexure.

The air pallet 10 forming a preferred embodiment of the invention therefore constitutes an air chamber-type of flexible air pallet for frictionless movement of a flexible load supported thereon (patient or inanimate object) relative to an underlying generally planer fixed support surface. Such air pallet includes means forming a flexible generally planar backing surface underlying the load. A thin flexible sheet directly or indirectly underlies the flexible backing surface and directly overlies the planar support surface having that portion facing the generally planar fixed support surface perforated, conforming to the footprint of the load and defining with the flexible backing surface at least one plenum chamber. The pin hole perforations open unrestrictedly directly to the plenum chamber. The means forming said backing surface comprises at least one flexible backing chamber underlying the load. Air dispersion means are operatively associated with the at least one plenum chamber to ensure air flow throughout said at least one plenum chamber when the air pallet is under load. The air pallet further comprises means for controlling pillowing of the flexible sheet portion of said at least one plenum chamber to jack the flexible backing surface and the load sufficiently to permit the air pallet to accommodate surface irregularities for both the load support surface and the flexible backing surface without ballooning. The air pallet includes lateral anti-shrink means for restricting the reduction in air pallet size that occurs in a plane parallel to the air bearing during pressurization of said at least one flexible backing chamber. Further, at least one common member (sheet 14) is joined at spaced positions, respectively, to said at least one flexible backing chamber of the upper row of chambers and said at least one flexible chamber of the lower row of chambers. Air inlet means 72, 82 function to pressurize said chambers to cause said at least one common member to become rigid and to thereby render said flexible, generally planar backing surface at least semi-rigid to at least support said load and to produce an air bearing upon jacking of the flexible backing surface and said load above said fixed support surface by escape of compressed air from said plenum chamber through said perforations. The sheet 14 which has portions common to the upper row of tubes and the lower row of tubes form a series of such linked "common members" or common walls.

By supplying compressed air to multiple stacked chambers there is provided adequate separation between the flexible load, the flexible generally planar backing surface underlying said load and the generally planar fixed support surface irrespective of loss of pressurization in a given one of said stacked flexible chambers.

Figure 32A:
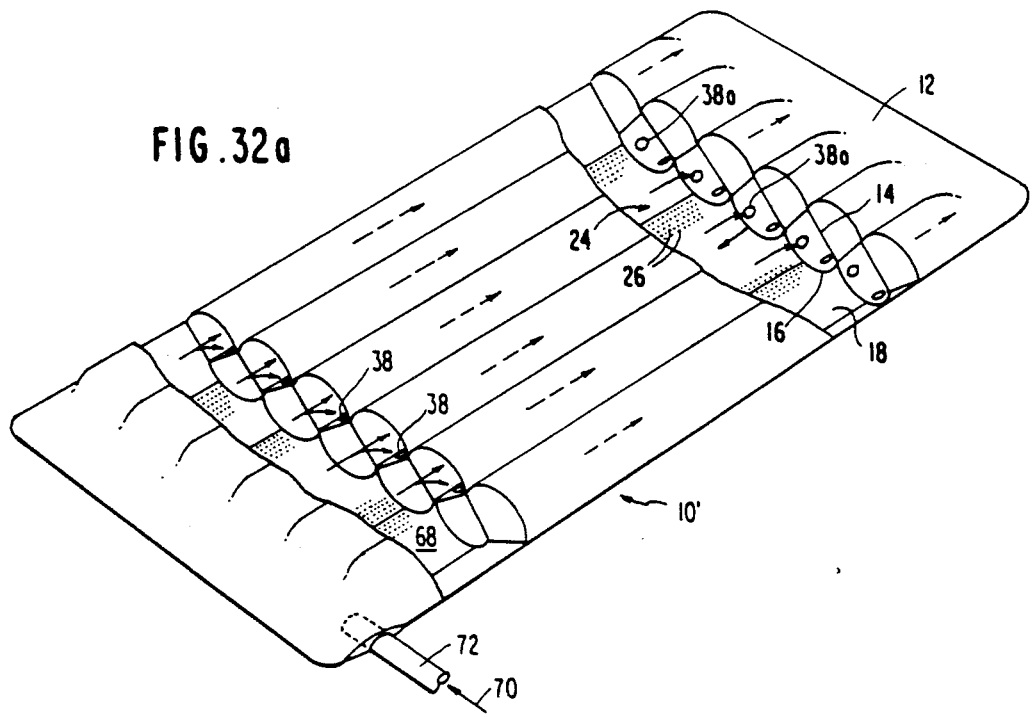
FIG. 32a is a perspective view, partially cut away, of the air pallet of FIG. 32, modified to form a flow through single air source type air pallet.

FIG. 32a shows a modification of the air pallet 10, at 10' which is of the flow through type, using a single source of air under pressure. Air pallet 10' has like elements to that of air pallet 10 bearing like numerical designations. Additionally holes or ports 38a within sheets 14 and 16 permit flow of compressed air from a single source 70 through a single inlet 72 to flow through the upper and lower rows of tubes defining multiple stacked backing chambers and thence through plenum chambers 68 via pin hole perforations 26 to form air bearing A.

Referring to FIGS. 33-38, inclusive, a further embodiment of the present invention in the form of a flow through soft pad or bladder type air pallet 10" is shown. The air pallet 10" is formed similarly to that of the embodiment of FIGS. 26-32 and is created by sewing together, thermal bonding, or heat sealing along narrow linear lines, a plurality of thin flexible sheets, in this case four in number. In air pallet 10", like elements to the embodiment 10 bear like numeral designations. Further the thin flexible sheet material may be identical to that employed in the first embodiment. However, in this embodiment, the row of physically linked tubes are not under constant air pressure, nor are the chambers completely sealed as in the air pallet 10 of FIG. 26. As a result, the sheet material may be other than completely imperforate, and sewing may be employed to connect the sheets together along seal lines instead of thermal bonding, in which case slight air leakage may occur at the stitching.

Referring to the drawings, the four sheets are a top sheet indicated generally at 12, a first intermediate sheet indicated generally at 14, a pair of opposite hand, second intermediate sheets 16, and a bottom sheet indicated generally at 18. Instead of the sheets being of rectangular form and different sized, the top sheet and bottom sheet 12, 18 are configured as a modified octagon having a squared, extended section 13 at one, foot end 20; the opposite head end 22 being devoid of such generally rectangular extension. At extension 13 there is provided a pair of air input or inlet valves 72 and 72' to the right and left, respectively, at the lateral edges 12a of the top thin flexible sheet 12.

Figure 26:
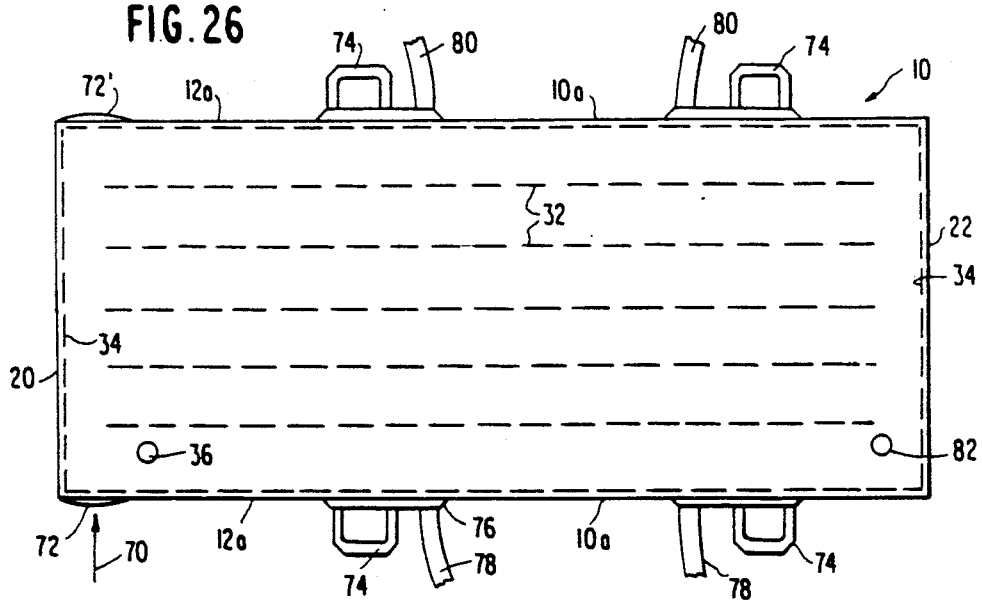
FIG. 26 is a top plan view of a four-sheet, flexible film air chamber-type patient mover air pallet forming a preferred embodiment of the present invention.
Figure 27:
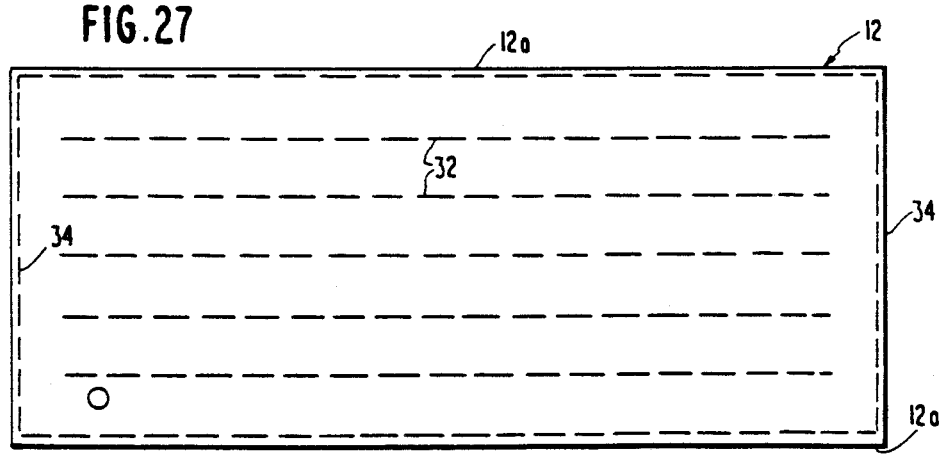
FIG. 27 is a top plan view of the top, thin, flexible sheet of the air pallet of FIG. 26.
Figure 28:
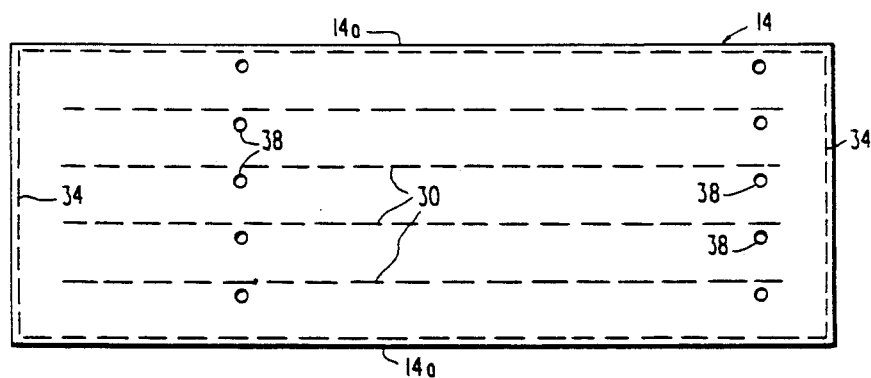
FIG. 28 is a top plan view of the first intermediate, thin flexible sheet of the air pallet of FIG. 26.
Figure 29:
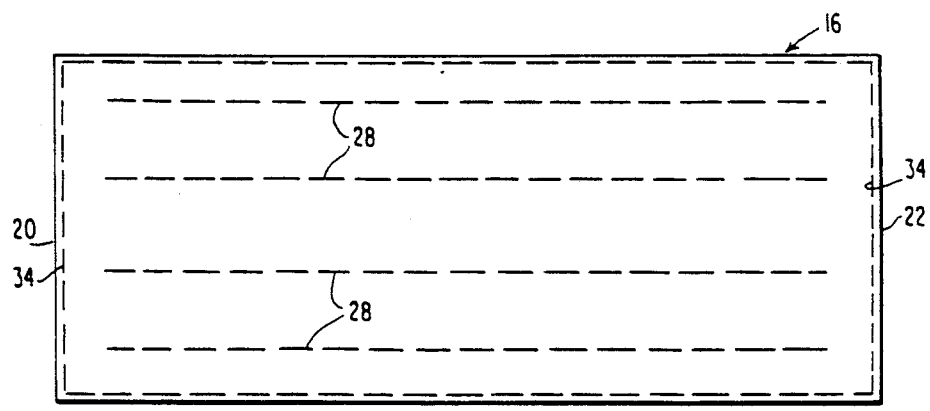
FIG. 29 is a top plan view of the second intermediate, thin flexible sheet of the air pallet of FIG. 26.

The air pallet 10" has particular application as a patient mover; however, it is not generally employed as an air mattress which is a principal function of the embodiment of FIG. 26. The first intermediate sheet 14 is, for instance, approximately 6 feet in length, corresponding to the overall length of the air pallet 10". It is of modified rectangular plan form, having opposite side edges 14a tapered at 15 towards the foot end 20 of the air pallet. The first intermediate sheet 14 is provided with four small diameter holes forming air flow ports 17 between the upper row tubes partially defined by sheet 14 and the top sheet 12 when sealed together in the manner of FIG. 37 and lower row tubes defined by sheets 14 and 16. The holes 17 appear within the rectangular portion of the sheet 14 closer to the end 22 of the air pallet than end 20.

Two second intermediate sheets 16 are employed in the air pallet 10" and are relatively narrow. They are of modified rectangular plan configuration, including a rectangular portion 19 which is proximate to head end 22 of the air pallet 10" and a laterally inward oblique portion 21 near the opposite foot end 20 of the air pallet 10". They are each of generally the same length as the air pallet 10" and the balance of the thin flexible sheets making up that assembly. The angulation of portion 21 conforms to the tapering of the top and bottom sheets 12, 18 of the lateral sides of those two members at foot end 20. Each of the second intermediate sheets 16 employed in the structure includes two longitudinally aligned holes or air flow ports 23 within the rectangular section 19 of the thin flexible sheet 16.

Figure 30:
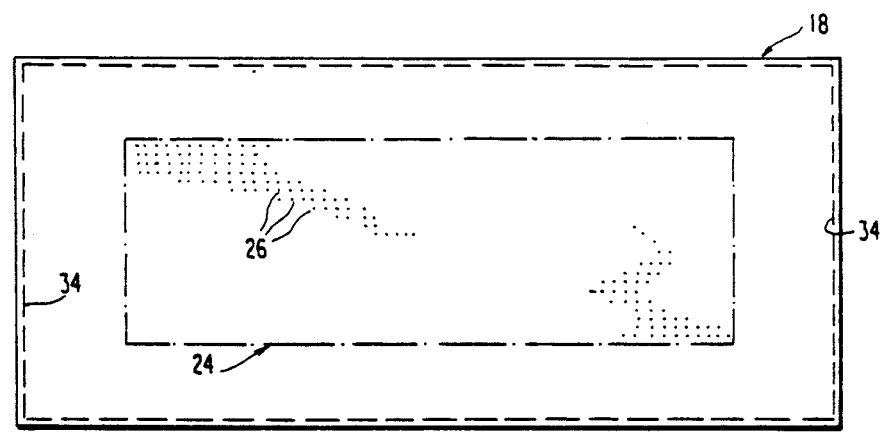
FIG. 30 is a top plan view of the bottom, thin flexible sheet of the air pallet of FIG. 26.
Figure 31:
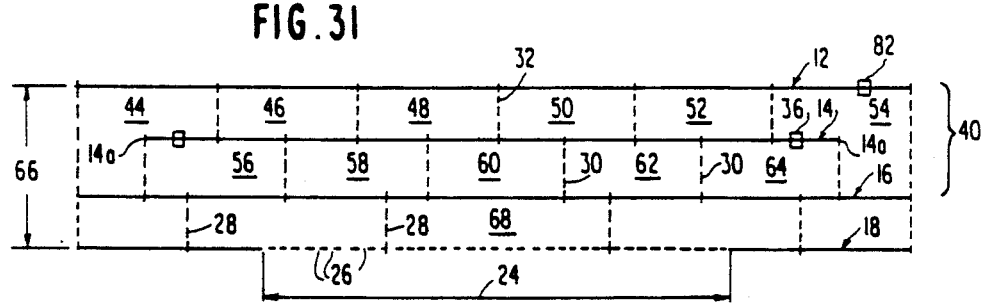
FIG. 31 is a schematic, vertical sectional view of the assembly of the four sheets for the air pallet of FIG. 26 and the longitudinal seal lines selectively joining the same to form air tubes or air chambers in multiple linked tube and linked row fashion for the air pallet of FIG. 26.

The thin flexible bottom sheet 18, although configured to that of the top thin flexible sheet 12, includes a modified perforated area 24 bearing thousands of closely spaced pin hole type perforations 26 in the manner of the embodiment of FIG. 10 as shown in FIG. 30, within the center of sheet 18. The lateral and longitudinal dimensions of the thin flexible sheets for the air pallets 10 and 10' may be generally identical, as well as the perforated area 24 of each bottom sheet 18 for the respective embodiments. The size of the perforated area 24 is determined by the mass of the patient or other load transported by the air pallet and the mass distribution of that load. The mass of a human body lies principally in the trunk, and this is the area of perforation disposition such that the footprint of the load conforms to the perforated area 24 of sheet 18, and thus the footprint of the air bearing A created beneath the bottom thin flexible sheet 18.

These general relationships exist for all of the embodiments of the invention described herein, and as shown in the drawings accompanying this description including embodiments 10, 10' and 10". The stacked sheets for air pallet 10" at 12, 14, 16 and 18 are illustrated schematically in FIG. 37 vertically separated so that the generation of the tube array may be appreciated in the completion of the air pallet structure by seam sewing, thermal bonding, or the like, at predetermined positions, and along lines extending over given lengths of the stacked layers of sheets. By reference to the various FIGS. 33-37, inclusive, with the thin flexible bottom sheet in place, a pair of opposite hand, second intermediate sheets 16 are positioned on sheet 18 and are bonded thereto along opposite lateral side edges via seal lines 28 over the full length of the air pallet, as evidenced in FIG. 35. Next, a first intermediate thin flexible sheet 14 is positioned so that its opposite lateral edges 14a overlap portions of the opposite hand sheets 16, and with sheet 14 centered laterally of the assembly of sheets 14, 16, 18. As may be appreciated, as per FIG. 34, laterally spaced, longitudinal seal lines are effected between sheet 14 and respective opposite hand sheets 16 as at 30 adjacent the lateral sides 14a the first intermediate thin flexible sheet 14. Those seal lines may be effected simultaneous with seal lines bonding the thin flexible sheet 14 to the top thin flexible sheet 12. In order to effect that action, it is preferable to insert a backing anvil positioned beneath the thin flexible opposite hand sheets 16 at the location of the two longitudinally extending parallel seal lines 30. If stitching is to be employed in the creation of the seal lines demarcating the various tubes or chambers, such anvil or backing member is not necessary. Lastly, the thin flexible top sheet 12 is placed on top of thin flexible sheet 14 completing the array. All four sheets 12, 14, 16 and 18 are sewn or thermo bonded together along top and bottom edges thereof. In this embodiment, five laterally spaced, longitudinally extending seal lines 32 are required to complete the assembly, including a seal line 32 at the lateral center, FIG. 33, to each side thereof and aligned with or supplementing seal lines 30 extending through the first intermediate sheet 14 and the opposite hand sheets 16, as per FIG. 37. Outer edge seal lines 32 are effected solely between the top thin flexible sheet 12 and bottom sheet 18 along the lateral edges of sheets 12 and 18. Since this is a compressed air flow through type "soft pad" air pallet, the seal lines do not have to completely seal off the various tubes formed thereby. Air flow which is initiated from inlet valve 72 or 72', via source 70 at end 20 of the air pallet 10" passes through four upper tubes or chambers 45, 47, 49 and 51, FIG. 37, and then via the small diameter ports 17 into central tube or chamber 55 of the lower row of tubes, and simultaneously by holes or ports 23 within the opposite hand intermediate thin flexible sheets 16 into the chambers or tubes 53 and 57 of the lower row of tubes. For flow to occur and for air pressurization of the chambers to occur simultaneously, smoothly in longitudinal progression and at equal pressure, the laterally central seal line 32 initiates at some distance from end 20 of the air pallet 10" and extends completely to the opposite end 22 of the air pallet. Seal lines 32 to opposite sides of the center seal line are initiated closer to end 20 and terminate short of end 22 by a distance of approximately 2 inches in this embodiment 10" which is approximately 6 feet in length. As a result, there is no jolt to the patient lying thereon, or a series of jolts by unequal air pressurization through parallel tubes with head jolt upon lift during jacking of the patient due to air flow through the row of tubes forming flexible backing chambers defined by three of the four sheets 12, 14, 16 upon air pressurization. In FIG. 34 the sewn seal line 32, common with the top sheet 12 is indicated on the first intermediate sheet 14. Additionally, seal lines 30 extend from a point near the pallet air inlet foot end 20, but not at that end, and continue towards the opposite end 22, but terminate short of that end by approximately three inches in the illustrated embodiment. This permits air equalization within at least all upper tubes forming flexible backing chambers 45, 47, 49 and 51 and eliminates patient trauma induced jolts. From FIG. 35 it may be seen that the laterally spaced seal lines 28, sealing lateral edges of the opposite hand sheets 16 to the bottom sheet 18 extend over the full length of the air pallet 10' from foot the air inlet foot end 20 to the opposite head end 22. As shown in FIG. 35, the seal lines 30 sealing a lateral edge of intermediate sheet 14 to the near lateral center of the opposite hand intermediate sheets 16 are initiated at some distance from the air inlet, foot end 20, and terminate short of the opposite head end 22.

Air pressurization is achieved through an inlet valve 72, schematically illustrated as a relatively small diameter tube in FIGS. 37 and 38, with the compressed air emanating from a supply or source indicated schematically by arrow 70. Air pressurization of the upper row of flexible backing chambers 45, 47, 49 and 51 is higher than that of the lower row of laterally offset, integrated tubes forming multiple plenum chambers 53, 55 and 57 defining air bearing A since the air enters the lower tubes from the upper row tubes through the multiple small diameter holes or air flow ports 23, 17. Preferably there are two or more longitudinally spaced holes feeding air from a respective upper row tube to a lower row tube.

Unlike the embodiment of FIG. 26, the patient mover type air pallet 10" of FIGS. 33-38 has no means for providing rigidity due to the nature of the construction and configuration of the upper tubes defined by sheets 12, 14. The air inlet valves 72, 72' may take appropriate form, such as that shown in U.S. Pat. Nos. 4,272,856 and 4,528,704. These valves automatically self seal when not in use so that the valves 72, 72' may be alternatively employed. In patient mover use, the end 20 becomes the foot end of the patient mover air pallet 10' and the opposite end 22 the head end. Air pressurization causes the collapsed thin flexible sheet formed soft pad air pallet 10" to initially fill the upper row flexible backing chamber tubes 45, 47, 49 and 51 and then the lower row plenum chamber tubes 53, 55 and 57 in sequence prior to the creation of the air bearing A by escape of the air flow through the perforations 26. In this case, the feet of the patient P are initially jacked prior to jacking of the patient's head. Trauma is not produced since the gas pressurization is uniform in development, and equal for respective tubes of the upper row tube array, and with the air pressure within the tubes of the lower row or array being slightly less due to the pressure drop caused by the air passage holes 17, 23. FIG. 38 shows the severe actions of hot dogging of air pallet 10" upon air pressurization, principally due to the size and lack of anti-shrink prevention means within central plenum chamber 55.

The air pallet 10", with the exception of spacing the head end longitudinal seal lines 32, 30 from the transverse seal line 34 at the edge of the air pallet 10 (commonly sealing off all sheets 12, 14, 16, 18 along narrower linear surface areas) is considered to be prior art to the subject matter of this invention. Further, certain of the means for controlling performance of air pallet 10" have basis in U.S. Pat. Nos. 3,948,844 and 4,417,639.

The shrink prevention means for patient mover 10 and lacking in patient mover 10" or like air pallets may take various forms and the geometry for creating structure providing that function may consist solely in thin flexible film material or the incorporation of semi-rigid or generally rigid elements of solid or hollow frame construction.

FIG. 39 is a vertical sectional transverse sectional view of a further patient mover type air pallet 10''' as a modification of the air pallet 10, FIG. 26-32, which, and in all other respects, includes the content of the drawing figures of that embodiment with like elements using like numerical designations. Air pallet 10''' utilizes the same four thin flexible sheets, a top sheet 12, a bottom sheet 18, two intermediate sheets 14, 16 to make up the thin flexible film formed structure for supporting a patient such as at P. Air pallet 10''' incorporates an additional intermediate thin flexible sheet 25 positioned between sheets 16 and 18 and edge sealed thereabouts on three sides, thus forming a backing member cavity 27 therebetween. A generally rigid board or sheet such as sheet 29, is provided within cavity 27 constituting additional lateral anti-shrink means for segmented plenum chamber 31. Additionally, in FIG. 40, this embodiment has the first intermediate sheet 14 imperforate, and accordion pleated with the edges of the pleats as at 33, thermal bonded or otherwise sealed longitudinally, alternatively to respective opposing surfaces of the top sheet 12 and the second intermediate sheet 16 to form closed sealed flexible backing chambers or tubes similar to that of FIG. 24. These consist of an upper row of chambers or sealed hollow tubes 35 and a lower row of such tubes 37 with common walls 41 subjected to pressurization on opposite sides by a chamber 35 and 37, respectively. Since the corrugated walls are common to two tubes, one on each side of an oblique wall, such common walls are rendered taut or rigid acting as I beams and this structure resists the tendency for the air pallet to hot dog, i.e., the opposite lateral edges to curl in response to gas pressurization of these chambers. Sheet 29 may be dispensed with since the flexible backing chambers render the air pallet generally rigid upon air pressurization. Additionally, the bottom thin flexible sheet 18 over the extent of the lateral perforated area bearing perforations 26, forms a series of adjacent plenum chambers or chamber sections 31 with the sheet 18 bonded to the bottom of the thin flexible sheet 25 at laterally spaced seal lines 39 which extend longitudinally and which additionally assist in maintaining the air bearing at A. Air under pressure is supplied through air inlet valve 72' to the left, and via a common transverse manifold (not shown) open to the balance of the segmental plenum chamber 31.

Alternatively, a rigid rectangular open frame 41. FIG. 40, may be inserted within backing member cavity 27, FIG. 39, whose longitudinally extending, laterally spaced beams 41a prevent lateral shrinking of the plenum chamber 31 such that the footprint of the air bearing A remains adequately sized for the footprint of the mass distribution of the load (patient P) positioned on the upper surface of the top thin flexible sheet 12. In a variation, the patient mover air pallet 10''' could be positioned within the frame 41 opening and strung on the frame by tensioned cords with the frame providing an exterior anti-shrink function.

Turning next to FIG. 41, a further embodiment of the patient mover type air pallet 10'''' is illustrated, again being a vertical sectional view corresponding to the air pallet 10 embodiment shown in FIG. 32 with modifications as shown in the drawings. Otherwise the air pallet 10'''' corresponds to air pallet 10, as described and shown in detail. One respect in which the structure 10'''' is modified resides in the utilization of vertical and oblique ties 43 formed of perforated flexible sheet material, being thermal bonded, sewn, heat sealed or the like at opposite ends to the thin flexible perforated bottom sheet 18 and to the second intermediate sheet 16 respectively. These ties 43 act, when taut, as additional physical restraints to prevent the structure from hot dogging, in response to air pressurization of the upper and lower rows of tubes 44 through 64, inclusive and the plenum chamber. While the dual tube array in FIG. 41 corresponding to FIG. 32, by having common walls of side by side laterally offset upper and lower row flexible backing chamber tubes, equally pressurized, normally adequately prevents excessive shrinkage of the portion of the plenum chamber 68 forming the air bearing A such that the footprint of the air bearing A between the air pallet 10'''' and the rigid planar support surface 11 beyond that capable of supporting the load P over its footprint, the ties 43 further assist in that purpose. Such ties may in themselves solely provide that function in a soft pad or hard pad air pallet. With the tubes 44–64 under constant pressure by application of compressed air to the tubes as per arrow 89 similar to the embodiment of FIG. 26, the application of a low cfm flow of air from a source indicated as arrow 70 through the air inlet valve 72 to plenum chamber 68 creates the air bearing A over a perforated area whose footprint may be readily maintained between 75% and 100% of the footprint cross sectional area of the load provided by the patient P supported by the pallet 10''''.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A patient mover air pallet for frictionless movement of a patient over an underlying, relatively fixed support surface, said patient mover air pallet comprising:
   top, intermediate and bottom thin flexible sheets,
   means for sealing given sheets together linearly to define a plenum chamber between said intermediate and bottom sheets,
   at least one backing member cavity between said top sheet and said intermediate sheet, said bottom thin flexible sheet including a portion defined by the footprint of the load having a plurality of closely spaced small diameter pin hole type perforations opening directly into the plenum chamber and directly onto said support surface,
   air inlet means communicating with the plenum chamber at one end thereof for permitting low pressure air flow pressurization of the plenum chamber for initially jacking the load and for subsequent discharge through the perforations to create a thin air film between the bottom thin flexible sheet and the support surface,
   means including said top thin flexible sheet defining a semi-rigid backing member so as to define with the plenum chamber air dispersion means for insuring air flow throughout the plenum chamber when the air pallet is under load at the time of air pressurization of the plenum chamber and constituting with said bottom thin flexible sheet, means for controlling pillowing of the thin flexible sheet material to permit jacking of the semi-rigid backing member and the load while preventing ballooning of the thin flexible sheet material, wherein said semi-rigid backing member permits deflection of the patient mover somewhat to conform the patient mover to depressions within the support surface to permit transport of the patient via the patient mover air pallet over said support surface wherein said top thin flexible sheet is sealed to said intermediate thin flexible sheet along longitudinal parallel lines at laterally spaced positions across the surface of the intermediate thin flexible sheet and at both ends thereof to form a series of longitudinally extending tubes, and wherein means are provided for supplying air under pressure to the individual tubes formed thereby in addition to air pressurization of the plenum chamber such that the tubes cradle the patient while facilitating transport of the patient over the support surface on the frictionless air film, the improvement comprising means for substantially restricting lateral shrinkage of the portion of the plenum chamber in the area of said perforations parallel to the plane of the developed air film for maintaining the footprint of the air film generally equal to that of the footprint of the load to insure stable support of the patient on the patient mover air pallet, and for preventing loss of said air film and grounding of the air pallet to the underlying support surface.

2. The patient mover air pallet as claimed in claim 1 wherein said means for substantially restricting lateral shrinkage of said plenum chamber over the width of said perforated portion of said thin flexible bottom sheet comprises two integral, linked vertical rows of said tubes extending transversely with the tubes of one row being laterally offset with respect to the other over the full lateral width of the perforated portion of the thin flexible bottom sheet such that the centers of tubes in one row are aligned with abutting peripheries of tubes of the adjacent row and adjacent tubes of said two rows have a common wall under pressurization to opposite sides rendered thereby taunt and rigid, and wherein said taut common walls render said two rows of tubes rigid under said load to stably support said load thereon.

3. The patient mover air pallet as claimed in claim 2 wherein said linked rows of tubes are sealed from said plenum chamber, and means are provided for separately supplying compressed air to said linked rows of tubes from that supplied to said at least one plenum chamber.

4. The patient mover air pallet as claimed in claim 3, further comprising a pressure relief valve operatively coupled to said linked rows of tubes and set to prevent the pressure therein from reaching a level inducing capillary closure of the patient supported by said patient mover air pallet.

5. The patient mover air pallet as claimed in claim 4, wherein said pressure relief valve is a variably adjustable valve such that said linked rows of tubes can be lightly air pressurized to form a highly supple comfortable air mattress for supporting a patient thereon over long periods of time without trauma, while providing therapy to said patient.

6. The patient mover air pallet as claimed in claim 2, wherein at least one of said tubes constituting said semirigid backing member carries said air inlet means at one end thereof opening directly thereto, and wherein at an opposite end thereof, an air flow port opens to an integral linked tube of another row of tubes to permit flow of low pressure air flow from one tube of one of said rows to said tube of another row via said air flow port and wherein the cross-sectional area of said air flow port is substantially less than the cross-sectional area of said air inlet means such that said one tube of said one linked row is at a higher pressure than said other tube of said another linked row of tubes.

7. The patient mover air pallet as claimed in claim 2, wherein openings are provided within said tubes of one row which open directly into tubes of the adjacent row, and wherein said tubes of said one or said adjacent row have further openings which open directly into the plenum chamber, and wherein at least one of said tubes of one of said rows carries air inlet means at one end thereof opening directly thereto, such that said patient mover air pallet constitutes a flow through soft pad with said flow of air being through said tubes of integral linked rows, and through said plenum chamber to effect said means for substantially restricting lateral shrinkage of the plenum chamber, while providing simultaneously said air film.

8. The patient mover air pallet as claimed in claim 2, wherein air pallet includes a second, intermediate thin flexible sheet, said second intermediate, thin flexible sheet is interposed between said first intermediate thin flexible sheet and said top sheet, and wherein said means for sealing given sheets together linearly comprise seal lines extending longitudinally over a given length of said thin flexible sheets at laterally spaced positions, such that said integral linked rows of end-to-end tubes are formed solely by said top and bottom thin flexible sheets and said first and second intermediate thin flexible sheets, and seal lines extending at least between two immediately adjacent flexible sheets.

9. The patient mover air pallet as claimed in claim 8, wherein said intermediate thin flexible sheets include holes therein forming air flow ports between respective tubes defined by said at least two immediately adjacent sheets and between laterally spaced seal lines for permitting air pressurization of a plurality of tubes formed thereby from a common source of air under pressure.

10. The patient mover air pallet as claimed in claim 8, wherein said bottom thin flexible sheet bearing said perforations includes means for coupling said bottom thin flexible sheet to said immediately adjacent intermediate thin flexible sheet at laterally spaced positions substantially across the extent of said area of perforations, so as to provide individual segments to said plenum chamber to prevent excessive slack in said bottom thin flexible sheet and bottoming out of the patient on the underlying relatively fixed support surface during air pallet operation and hot dogging of said air pallet.

11. The patent mover air pallet as claimed in claim 8, further comprising a third, intermediate thin flexible sheet edge sealed to intermediate thin flexible sheets to opposite sides thereof, and defining a backing member cavity, and wherein a generally rigid backing member is carried within said cavity and comprises part of said means for substantially restricting lateral shrinkage of said plenum chamber over at least the width of said perforated portion of said bottom thin flexible sheet.

12. The patient mover air pallet as claimed in claim 8, wherein said means for substantially restricting lateral shrinking of said plenum chamber over at least the width of said perforated portion of said thin flexible bottom sheet comprises ties within said plenum chamber, having opposite ends fixed respectively to said bottom thin flexible sheet and said intermediate thin flexible sheet proximate thereto forming said integral linked rows of tubes extending transversely across the width of said air pallet.

13. The patient mover air pallet as claimed in claim 12, wherein said ties extend perpendicularly through said plenum chamber at right angles to the plane of said air film and that of the patient supported thereby.

14. The patient mover air pallet as claimed in claim 12, wherein said ties extend obliquely from said bottom thin flexible sheet inwardly towards the center of said plenum chamber to engage said integral linked rows of tubes to restrict movement of said bottom thin flexible sheet away from the integral linked rows of tubes and towards the respective lateral sides of said patient mover air pallet.

15. A flexible air pallet for frictionless movement of a flexible load supported thereon relative to an underlying generally planar fixed support surface, said air pallet including:
   a first thin flexible sheet forming a flexible, generally planar backing surface underlying the load,
   a second thin, flexible sheet underlying the flexible backing surface and directly overlying the planar support surface,
   said second thin, flexible sheet having a portion facing the generally planar fixed support surface perforated over a surface area generally conforming to the footprint of the load and defining with the flexible backing surface, at least one plenum chamber,
   said perforations opening unrestrictedly directly to the plenum chamber,
   air dispersion means operatively associated with said at least one plenum chamber to insure air flow throughout said at least one plenum chamber when the air pallet is under load,
   means for controlling pillowing of the thin, flexible sheet portion of said at least one plenum chamber to jack the flexible backing surface and the load sufficiently to permit the air pallet to accommodate surface irregularities for both the load support surface and the flexible backing surface without ballooning, and
   air inlet means for supplying compressed air to said at least one plenum chamber,
   the improvements wherein said air pallet includes within said at least one plenum chamber, at least one flexible common member joined at spaced positions respectively to said first and second flexible sheets within the perforated area underlying the footprint of the load and being of limited length, whereby said air inlet means in supplying air under pressure to said at least one plenum chamber causes said at least one common member to become taut and rigid and to thereby render said flexible, generally planar backing surface at least semi rigid to at least support said load and to produce an air film upon jacking of the flexible backing surface and the load above said fixed support surface by escape of compressed air from said at least one plenum chamber through said perforations, and said at least one flexible common member defining lateral anti shrink means for restricting the reduction in air pallet size in a plane parallel to the air film during air pressurization of said at least one plenum chamber.

16. The air pallet as claimed in claim 15, wherein said at least one flexible member is a third thin, flexible sheet joined at lateral spaced positions alternatively to said first and second thin flexible sheets.

17. The air pallet as claimed in claim 16, wherein said third thin flexible sheet comprises a series of unitary portions common to an upper row of tubes and a lower row of tubes, said upper row of tubes defining plural flexible backing chambers, and
   said lower row of tubes defining a plurality of linked plenum chambers, and wherein,
   said upper and lower rows of tubes extend completely across the area of said perforations and provide adequate separation between the flexible load, the flexible generally planar backing surface underlying the load and the generally planar fixed support surface, irrespective of loss of pressurization in a given one of said tubes of either of said rows of tubes.

18. A flexible air chamber-type air pallet for frictionless movement of a load support thereon relative to an underlying generally planar fixed support surface, said air pallet being formed of thin, flexible sheet material consisting of a first thin, flexible sheet at least partially defining a flexible, generally planar backing surface for supporting said load thereon, and
   a second thin, flexible sheet directly underlying and sealed to said backing surface and directly overlying said fixed load support surface and being sealed thereto along longitudinal lines at laterally spaced positions to form a series of laterally connected plenum chambers, said second thin, flexible sheet having a plurality of perforations therein facing said fixed support surface within said linked plenum chambers, said perforations opening directly into and out of said plenum chambers,
   air dispersion means for said plenum chambers to insure air flow through said chambers when said air pallet is under load,
   air inlet means to said chambers for directing compressed air into said plenum chambers for jacking said load and for discharge of said air from the plenum chambers through said perforations to create an air film between said thin, flexible bottom sheet and said fixed support surface,
   pillowing means to cause, upon air pressurization of said chambers said thin, flexible sheet portions of said chambers to jack the backing surface and said load sufficiently to permit the pallet to accommodate surface irregularities and to move said load on said air film,
   means for rendering said plenum chambers sufficiently rigid under said load to support said load when said chambers are pressurized, and
   means for limiting the amount of lateral shrink across the air pallet upon air pressurization of said plenum chambers so that said air pallet plenum chambers can lift said load.

19. The flexible air chamber-type air pallet as claimed in claim 18, further comprising:
   means for rendering said plenum chambers in the area of said perforations sufficiently rigid to prevent load instability and to prevent hot dogging of said linked plenum chambers underlying said load.

20. The air pallet as claimed in claim 18, wherein said first thin, flexible sheet is joined to said second thin, flexible bottom sheet by longitudinally extending parallel seal lines to form a side-to-side array of parallel tubes, with the lateral width between the seal lines for one of said thin, flexible sheets being significantly different from that of the other thin, flexible sheet, thereby providing inherently the tendency to arch the thin, flexible sheet whose lateral width between adjacent parallel seal lines is narrower than that of the other thin, flexible sheet, upon air pressurization of the linked plenum chambers.

21. Said flexible air chamber-type air pallet as claimed in claim 20, wherein said air pallet comprises hollow tubes extending generally at right angles to said side-to-side array of tubes defined by said first and second thin, flexible sheets at both sides thereof and constituting said means for rendering said air pallet plenum chambers generally rigid to prevent load instability and for preventing grounding and insuring that the load is jacked sufficiently from the underlying fixed support surface to permit the pallet to accommodate surface irregularities and to move said load on said air film.

22. The flexible air chamber-type air pallet as claimed in claim 18, wherein said thin, flexible bottom sheet tends to flatten in the vicinity of the underlying relatively fixed support surface under load, when said chambers are air pressurized, and wherein the perforations within said plenum chambers exist solely within the flattened area of said thin, flexible bottom sheet for each of said plenum chambers, thereby maintaining the footprint of the developed air film sized to that of said load.

23. A flexible film air chamber-type air pallet for frictionless movement of a load supported thereon relative to an underlying generally planar fixed support surface, said air pallet comprising:

a flexible, generally planar backing surface for supporting said load thereon, a thin, flexible sheet directly underlying said flexible backing surface and directly overlying said load support surface, a portion of said thin, flexible sheet facing said generally planar fixed support surface being perforated and being sealed to and defining with said backing surface at least one plenum chamber, said perforations extending over an area generally corresponding to the footprint of the load with said perforations opening directly into said at least one plenum chamber, air dispersion means for said plenum chamber to insure air flow through said chamber when said chamber is under load and being pressurized, air inlet means opening to said at least one plenum chamber for permitting air under pressure to enter into the plenum chamber for jacking said load, for discharge of the air from said plenum chamber through said perforations to create an air film between the flexible, thin sheet and said fixed support surface over the area of the perforations, pillowing means for jacking the backing surface and said load sufficiently to permit the pallet to accommodate surface irregularities and move said load on a film of air without said thin, flexible bottom sheet ballooning, means for preventing said at least one plenum chamber from hot dogging for preventing load instability and for maintaining said at least one plenum chamber planar in a direction parallel to the developed air film for retention of the load on said backing surface during movement of said load via said air pallet on said developed air film, and means for limiting shrink of the air pallet laterally parallel to the plane of the developed air film over the surface area of the perforations to insure that the footprint of the air film generally matches that of the load.

24. The flexible air chamber-type air pallet as claimed in claim 23, further comprising means for rendering said flexible generally planar backing surface rigid under said load to support said load upon jacking when said at least one plenum chamber is air pressurized.

25. In a flexible air chamber-type air pallet for frictionless movement of a load supported thereon relative to an underlying generally planar fixed support surface, said air pallet being formed of thin, flexible sheet material comprising a first thin, flexible sheet at least partially defining a flexible, generally planar backing surface for supporting said load thereon, and a second thin, flexible sheet underlying said backing surface and directly overlying said fixed load support surface and being connected thereto along longitudinal lines at laterally spaced positions to form a series of laterally connected, linked plenum chambers, said second thin, flexible sheet having a plurality of perforations therein facing said fixed support surface within said linked plenum chambers, said perforations opening directly into and out of said plenum chambers, air dispersion means for said plenum chambers to insure air flow through said chambers when said air pallet is under load, air inlet means to said chambers for directing compressed air into said plenum chambers for jacking said load and for discharge of said air from the plenum chambers through said perforations to create an air film between said thin, flexible bottom sheet and said fixed support surface, pillowing means to cause, upon air pressurization of said chambers said thin, flexible sheet portions of said chambers to jack the backing surface and said load sufficiently to permit the pallet to accommodate surface irregularities and to move said load on said air film, the improvement comprising:

means for controlling the amount of lateral shrink across the pallet upon air pressurization of said plenum chambers so that said air pallet plenum chambers can lift said load, and means for rendering said first thin flexible sheet over the area of said perforations sufficiently rigid to support said load when the chambers are pressurized and means to prevent load instability and hot dogging of said air pallet under load.

26. A flexible film air chamber-type air pallet for frictionless movement of a load supported thereon relative to an underlying generally planar fixed support surface, said air pallet comprising:

a flexible, generally planar backing surface for supporting said load thereon, a thin, flexible sheet underlying said flexible backing surface and directly overlying said load support surface, a portion of said thin, flexible sheet facing said generally planar fixed support surface being perforated and being sealed to and defining with said backing surface at least one plenum chamber, said perforations extending over a surface area of said thin, flexible sheet corresponding generally to the footprint of the load with said perforations opening directly into said at least one plenum chambers, air dispersion means for said plenum chamber to insure air flow through said chamber when said chamber is under load and being pressurized, air inlet means opening to said at least one plenum chamber for permitting air under pressure to enter the at least one plenum chamber for jacking said load, and for discharge of the air from said plenum chamber through said perforations to create an air film between the flexible, thin sheet and said fixed support surface over the area of the perforations, pillowing means for jacking the backing surface and said load sufficiently to permit the pallet to accommodate surface irregularities and move said load on a film of air without said thin, flexible bottom sheet ballooning, and means for preventing said at least one plenum chamber from hot dogging, for preventing load instability, for maintaining said flexible backing surface planar in a direction generally parallel to the developed air film for retention of the load on said backing surface during movement of said load via said air pallet on said developed air film and for limiting shrink of the air pallet laterally, generally parallel to the plane of the developed air film to insure that the footprint of the air film generally matches that of the load, and means for rendering said flexible generally planar backing surface sufficiently rigid under said load to support said load upon jacking when said at least one plenum chamber is air pressurized.

* * * * *